United States Patent [19]
Yonezawa et al.

[11] Patent Number: 5,989,425
[45] Date of Patent: Nov. 23, 1999

[54] MULTI-WAY VALVE AND WATER PURIFIER USING THE SAME

[75] Inventors: Yasuo Yonezawa, Nagoya; Jyunji Itakura, Gamou-gun; Takashi Isobe, Otsu; Sho Tamatsu, Kyoto, all of Japan

[73] Assignee: Toray Industries, Inc., Japan

[21] Appl. No.: 08/747,954

[22] Filed: Nov. 12, 1996

[30] Foreign Application Priority Data

Nov. 17, 1995 [JP] Japan .................................. 7-300247
Dec. 19, 1995 [JP] Japan .................................. 7-349220

[51] Int. Cl.⁶ .................................................. B01D 24/48
[52] U.S. Cl. ............................................. 210/282; 210/424
[58] Field of Search ................................. 210/266, 282, 210/420, 424

[56] References Cited

U.S. PATENT DOCUMENTS

| | | | |
|---|---|---|---|
| 4,147,631 | 4/1979 | Deines et al. | 210/424 |
| 4,172,796 | 10/1979 | Corder | 210/282 |
| 4,504,389 | 3/1985 | Rundzaitis | 210/266 |
| 4,686,037 | 8/1987 | Lang | 210/424 |
| 4,770,768 | 9/1988 | Lang | 210/282 |
| 4,980,073 | 12/1990 | Woodruff | 210/424 |
| 5,017,286 | 5/1991 | Heiligman | 210/282 |
| 5,160,038 | 11/1992 | Harada et al. | 210/266 |
| 5,192,436 | 3/1993 | Sasaki et al. | 210/282 |

*Primary Examiner*—Ivars Cintins
*Attorney, Agent, or Firm*—Austin R. Miller

[57] ABSTRACT

Disclosed is a multi-way valve comprising a valve casing having a fluid inlet and a plurality of fluid outlets, first and second chambers defined in the valve casing, a partition disposed between the first and second chambers and having a plurality of fluid paths, a plurality of valve elements each engaging a corresponding fluid path from the first chamber side for opening and closing the fluid path and a driving device having cams which selectively drive the valve elements from the second chamber side. The multi-way valve can be manufactured as a small-sized one, and therefore, a water purifier using the valve also can be assembled as a small-sized one as a whole. The amount of resident fluid in the valve can be decreased, thereby improving the hygienic property of the water purifier. The operation for taking off or exchanging valve elements can be simplified.

16 Claims, 23 Drawing Sheets

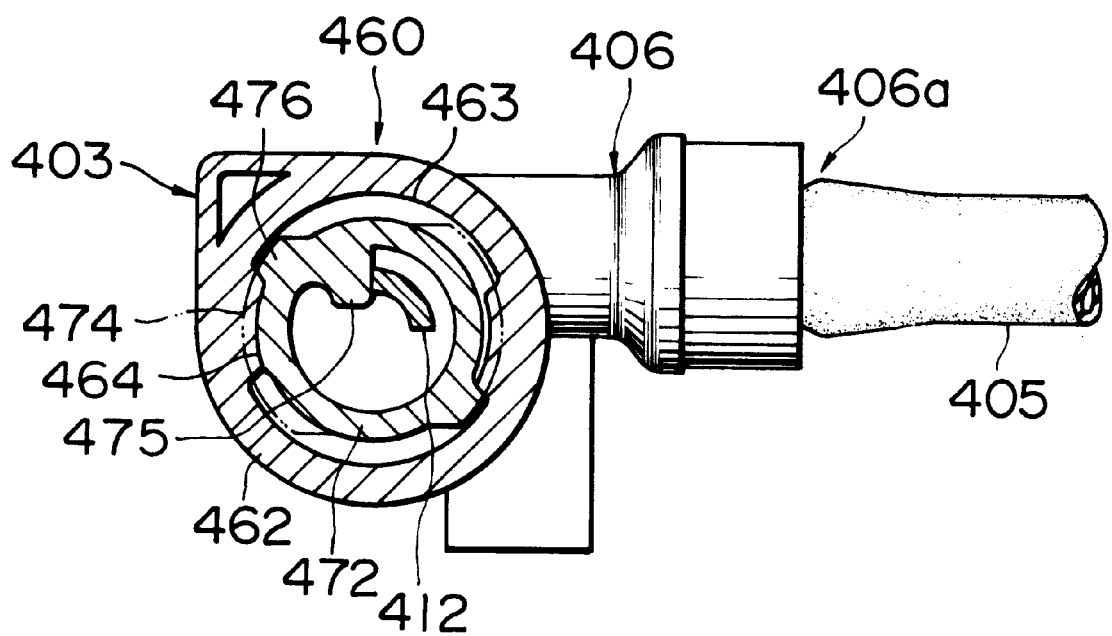
F I G. 30

MULTI-WAY VALVE AND WATER PURIFIER USING THE SAME

BACKGROUND OF THE INVENTION

1. Field of the Invention

The present invention relates to a multi-way valve, a water purifier using the same, and to a method for distributing or mixing a fluid, and more particularly to a multi-way valve for distributing or mixing a fluid, and to a water purifier and a fluid distributing or mixing method that embodies this multi-way valve.

2. Description of the Prior Art

Conventional multi-way valves, for distributing or mixing a fluid, include a so-called rotary-type valve wherein individual fluid paths are switched by rotating a seal member (for example, U.S. Pat. Nos. 4,172,796, 4,770,768 and 5,160,038) and they also include a so-called sliding-type valve wherein fluid paths are switched by linearly moving a seal member. However, any of these multi-way valves has problems with durability and sealing. Therefore, in order to solve these problems, the following valves have been proposed.

(1) a multi-way valve wherein a plurality of spherical elements for closing fluid paths are provided in a valve casing having a single chamber, wherein any one spherical element is pressed and moved in a circumferential direction relative to the casing by rotating a rotatable shaft for opening a corresponding fluid path (for example, Japanese Utility Model Publication HEI-7-12770)

(2) a multi-way valve wherein a fluid inlet and a plurality of fluid outlets are provided to a valve casing, and spherical elements are provided for closing the respective fluid outlets, and any spherical element is moved in a direction parallel to the axis of the rotatable member by rotating the rotatable member for opening a corresponding fluid outlet (for example, Japanese Utility Model Laid-Open HEI-4-132271)

(3) a multi-way valve wherein a fluid inlet and two fluid outlets are provided in a valve casing, and balls are provided for closing the fluid outlets by pressure of water supplied from the fluid inlet, and any ball is displaced from a valve seat by rotation of a shift arm for opening a corresponding fluid outlet (for example, Japanese Utility Model Laid-Open HEI-6-16778)

However, when a multi-way valve described in the above (1) is employed, because the spherical element must be moved in a circumferential direction by rotating the rotatable shaft, the amount of movement of the spherical element inevitably becomes great, with the defect that the multi-way valve becomes large-sized and the amount of resident fluid in the valve increases causing a problem of poor hygienic property originating from the great amount of the resident fluid. Further, because the spherical elements must be taken off by disassembling the valve casing when the spherical elements are checked or exchanged for checking or improving the sealing ability due to the spherical elements, the required work becomes remarkably troublesome. Furthermore, there is a further problem that the shape of the rotatable shaft and the inside shape of the valve casing are complicated and the multi-way valve becomes expensive.

In a case where a multi-way valve described in case (2) is employed, because the spherical element must be moved in a direction parallel to the axis of the rotatable member by rotating the rotatable member, the amount of movement of the spherical element along the axis of the rotatable member becomes great, causing a defect that the multi-way valve becomes large-sized. If the multi-way valve becomes large-sized, the amount of resident fluid in the valve increases and there is a problem of poor hygienic property originating from the great amount of the resident fluid. Further, because the spherical elements must be taken off by disassembling the valve casing when the spherical elements are checked or exchanged for checking or improving the sealing ability due to the spherical elements, the work becomes considerably troublesome.

In a case where a multi-way valve described in the above (3) is employed, because the ball must be moved in a single chamber of the valve casing by rotating the shift arm, the size of the chamber inevitably becomes great, and the multi-way valve becomes large-sized, the amount of resident fluid in the valve increases and hygienic problems originate from the great amount of the resident fluid. Further, because the balls must be taken off by disassembling the valve casing when the balls are checked or exchanged for checking or improving the sealing ability due to the balls, the work becomes remarkably troublesome. Furthermore, because the shape and the attachment condition of the shift arm must be set in proper conditions, the multi-way valve must be assembled with meticulous care and there is a fear of causing a defect and the multi-way valve becomes expensive.

Further, a multi-way valve having an inflow path and a plurality of outflow paths wherein the fluid paths are switched by a pushing member is also known.

As this type of multi-way valve, as disclosed in Japanese Utility Model Publication SHO 63-8460 and Japanese Utility Model Laid-Open SHO 60-151972, there is a cylinder-piston type valve comprising a cylinder having a fluid inlet and fluid outlets and a piston sliding in the cylinder and having a seal member. Further, as disclosed as switching valves in JP-A-SHO 48-10631 and JP-A-SHO 52-45732, there is a ball-type valve closing a fluid outlet by a ball and opening the fluid outlet by moving the ball.

However, in the former cylinder-piston type multi-way valve, because the seal member fixed to the piston is slid on the fluid inlet or the fluid outlet of the cylinder while being pressed, there is a problem that abrasion quickly progresses and the seal member must be exchanged in a short period of time.

On the other hand, in the latter ball-type multi-way valve, because the fluid paths are switched by rolling the ball provided as a seal member, the problem of abrasion, such as the one in the former valve, can be improved. However, because an operating lever connected to an operating member provided for moving the ball extends through a valve box and both end portions thereof protrude outside of the valve box, a motion of grasping one end of the lever to pull the lever or pushing the other end of the lever is required for the switching operation, and such an operation is inconvenient and cannot be easily performed.

In order to improve such a problem, a valve able to operate only at one end of an operating lever was proposed, for example, as a ball-type water passage switching device for a faucet described in Japanese Utility Model Publication SHO 51-26357. In this switching device for a faucet, however, because a certain length is required for a rotatable shaft of an operating lever extending through a wall of a switching chamber in a direction perpendicular to the wall and a seal member must be provided for sealing the rotatable shaft, the valve body tends to become large-sized in the axial direction of the shaft and such a valve is not preferred as a valve for a faucet of an ordinary home. Further, because most faucets for an ordinary home are formed as a type in which a discharge pipe can be rotated in right-hand and left-hand directions (clockwise and counterclockwise directions), the method for operating an operating lever by moving the lever in right-hand and left-hand direction has a problem that the operation is not easy because the discharge pipe is rotated together with the operating lever.

Further, JP-B-HEI-5-31036 discloses a ball-type check valve for water in which an operating lever is moved in frontward and rearward directions relative to a discharge pipe. In this check valve, however, because pushing rods for moving balls, springs and seal members are required by the same number as that of fluid outlets, the number of parts increases and the structure of the valve becomes complicated.

SUMMARY OF THE INVENTION

An object of the present invention is to provide a multi-way valve which can be formed small-sized as a whole, can decrease the amount of resident fluid therein and can facilitate the work for taking off and exchanging valve bodies. Another object is to create a water purifier and a method for distributing or mixing a fluid using the multi-way valve.

Another object of the present invention is to provide a multi-way valve which can switch fluid paths easily and appropriately and whose mechanism for valve switching operation can be simplified, and to provide a water purifier using the multi-way valve.

To accomplish the above objects, a multi-way valve according to the present invention comprises a valve casing having a fluid inlet and a plurality of fluid outlets; a first chamber and a second chamber defined in said valve casing, the first chamber communicating with the fluid inlet, the second chamber communicating with the plurality of fluid outlets, respectively; a partition disposed between the first and second chambers and separating the first and second chambers, the partition having a plurality of fluid paths provided in correspondence with the plurality of fluid outlets and capable of connecting the first and second chambers to each other; a plurality of valve elements each engaging a corresponding fluid path of the plurality of fluid paths from a side of the first chamber and opening and closing the corresponding fluid path; and a driving device having cams which selectively drive the plurality of valve elements from a side of the second chamber (hereinafter, referred to as a first multi-way valve).

In this first multi-way valve, the valve elements are preferably formed as spherical elements. Further, it is preferred that each of the valve elements formed as spherical elements comprises a core composed of a rigid material and an elastic material provided on the surface of the core. The driving device preferably comprises a rotatable body on which the cams are arranged along an axial direction of the rotatable body. Further, for example, this first multi-way valve can be formed as a structure wherein communicating paths are formed between the plurality of fluid paths and the plurality of fluid outlets, respectively, and the respective communicating paths are separated from each other by the driving device.

Further, another multi-way valve according to the present invention comprises a valve casing having a fluid inlet and a plurality of fluid outlets; at least one spherical element disposed in the valve casing for opening and closing the fluid outlets; a contact member brought into contact with the spherical element, the contact member moving to open and close the fluid outlets by displacing the spherical element; a movable member moving the contact member; a pushing member driving the movable member by pushing operation of the pushing member; and a stopping mechanism for temporarily stopping the movable member at a predetermined position (hereinafter, referred to as a second multi-way valve).

In this second multi-way valve, the movable member, for example, is moved reciprocatively and the pushing member drives the movable member so as to push the contact member via the movable member. The stopping mechanism comprises, for example, a guide cylinder having a same number of deep grooves and shallow grooves defined on an inner surface of the guide cylinder to extend in an axial direction of the guide cylinder, the deep grooves and shallow grooves being arranged alternately in a circumferential direction of the guide cylinder and defining linear guide convex portions between respective adjacent deep grooves and shallow grooves, an end surface of each linear guide convex portion and an end surface formed at a position corresponding to an end portion of each shallow groove adjacent to each linear guide convex portion being formed as a slope such as a continuous slope; a reciprocating cam member having reciprocating cams slidable along the deep grooves and shallow grooves; a rotating cam member engaged to the movable member and having rotating cams slidable only along the deep grooves; and means for urging the movable member toward the rotating cam member. Further, it is preferred that a rotation preventing member is provided in the valve casing for preventing rotation of the contact member. Furthermore, it is preferred that the contact member comes into contact with a spherical surface of the spherical element at a position eccentric from a center of gravity of the spherical element toward the fluid outlets. The ratio of diameter of the spherical element to the inner diameter of the fluid outlets is preferably in the range of 1:0.3 to 1:0.8.

A water purifier according to the present invention has a multi-way valve for switching incoming raw water to at least one of a plurality of outflow destinations, and means for filtering the raw water introduced through the multi-way valve. The multi-way valve comprises a valve casing having a fluid inlet and a plurality of fluid outlets; a first chamber and a second chamber defined in the valve casing, the first chamber communicating with the fluid inlet, the second chamber communicating with the plurality of fluid outlets, respectively; a partition disposed between the first and second chambers and separating the first and second chambers, the partition having a plurality of fluid paths provided in correspondence with the plurality of fluid outlets and capable of communicating the first and second chambers to each other; a plurality of valve elements each engaging a corresponding fluid path of the plurality of fluid paths from a side of the first chamber and opening and closing the corresponding fluid path; and a driving device having cams which selectively drive the plurality of valve elements from a side of the second chamber. Hereinafter, this water purifier is referred to as a first water purifier.

In this first water purifier, preferred aspects of its multi-way valve are the same as those of the aforementioned first multi-way valve.

Further, another water purifier according to the present invention has a multi-way valve for switching raw water introduced to at least one of a plurality of outflow destinations and means for filtering the inflowing raw water through the multi-way valve, and the multi-way valve comprises a valve casing having a fluid inlet and a plurality of fluid outlets; at least one spherical element disposed in the valve casing for opening and closing the fluid outlets; a contact member brought into contact with the spherical element, the contact member moving to open and close the fluid outlets by displacing the spherical element; a movable member moving the contact member; a pushing member driving the movable member by pushing operation of the pushing member; and a mechanism for temporarily stopping the movable member at a predetermined position. Hereinafter, this water purifier is referred to as a second water purifier.

In this second water purifier, preferred aspects of its multi-way valve are the same as those of the aforementioned second multi-way valve.

The above-described first and second water purifiers can be applied to a water purifier formed so that both the multi-way valve and the filtering means thereof are attached to a faucet. Alternatively, they can be applied to a water purifier wherein only the filtering means thereof or both the multi-way valve and the filtering means thereof are placed on a base. Namely, they can be formed as any type of water purifier of a so-called cartridge-type water purifier directly attached to a faucet and a so-called top sink-type water purifier.

Further, a method for distributing or mixing a fluid according to the present invention is a method particularly using the first multi-way valve. Namely, this is a method for distributing a fluid introduced from a single fluid inlet to at least one of a plurality of fluid outlets, or mixing fluids introduced from a plurality of fluid inlets by supplying the fluids to a single fluid outlet, and the distributing or mixing method comprises the steps of interposing fluid paths corresponding to the plurality of fluid outlets or the plurality of fluid inlets between a first chamber communicating with the single fluid inlet or the plurality of fluid inlets and a second chamber communicating with the plurality of fluid outlets or the single fluid outlet; closing the fluid paths by valve elements provided in the first chamber utilizing self-weights of the valve elements and a fluid supply pressure; and driving at least one of the valve elements selectively from a side of the second chamber for opening at least one of the fluid paths by pushing up a corresponding valve element in accordance with a predetermined fluid distributing or mixing condition.

In the first multi-way valve, the fluid paths connecting the first and second chambers are surely closed by the valve elements utilizing self-weights of the respective valve elements and a pressure of the supplied fluid, and good sealing can be achieved. A part of the valve elements are or is selectively moved toward the first chamber by driving the driving device, a corresponding fluid path is opened, and the fluid is supplied to the second chamber through the opened fluid path. A desired fluid distribution or mixing can be achieved by this opening operation of the selected fluid path. When the fluid path is opened, because the selected valve element may be slightly moved toward the first chamber side by the operation from the second chamber side, the amount of the movement of the valve element decreases as compared with conventional multi-way valves. As a result, the multi-way valve can be formed small-sized as a whole and the amount of resident fluid in the valve can be reduced.

Further, when required to take off or exchange the valve elements, because only the first chamber may be opened, the work required can be greatly facilitated as compared with the work in a conventional multi-way valve in which the whole of the multi-way valve must be disassembled.

Furthermore, when the valve element is formed as a spherical element and it is constructed from a core of a rigid material and an elastic material layer covering the surface of the core, an impact caused when the valve element closes a corresponding fluid path can be greatly decreased and abrasion of the corresponding portions can be suppressed also a good sealing ability can be achieved by the elastic material layer.

In the water purifier using this first multi-way valve, either one position for purifying the raw water or one position for flowing the raw water out without purification can be easily selected, and the whole of the water purifier easily can be formed small-sized.

Further, in the method distributing or mixing a fluid using the first multi-way valve, the fluid paths can be surely closed by the self-weights of the valve elements and a fluid supply pressure, and a good sealing ability can be had. When a selected fluid path is opened, the corresponding valve element closing the fluid path may be merely slightly moved by pushing up the valve element from the second chamber side. Therefore, a desired fluid distribution or mixing can be easily and surely performed by a simple and small operation.

In the second multi-way valve, when the pushing member provided to the valve casing is pushed, the movable member transmits the movement of the pushing member to the contact member provided in the valve casing. Then, the contact member forcibly displaces at least one spherical element provided as a valve element by the above-described operation. The spherical element closes (or opens) a predetermined fluid outlet of a plurality of fluid outlets provided to the valve casing. At that time, the stopping mechanism operates and the movable member is temporarily stopped at a predetermined position, and position where the spherical element closes (or opens) the fluid outlet can be maintained. When the pushing member is pushed again, the lock due to the stopping mechanism is released and the movable member returns to an initial position, and the spherical element opens (or closes) the fluid outlet via the operation of the contact member.

In such an operation, because the contact member can forcibly displace a spherical element provided in the valve casing via the movable member merely by a single pushing operation by the pushing member, the switching mechanism for the valve can be simply constructed, and the plurality of fluid outlets can be opened and closed easily and appropriately.

Further, in a case where the stopping mechanism having the guide cylinder is employed, the reciprocating cam member is slid along the deep and shallow grooves by the operation of the pushing member, and the rotating cam member is also slid in the guide cylinder by sliding the rotating cams, which are engaged with the reciprocating cams, along the deep grooves. When the rotating cams are pushed up to the end surfaces of the guide convex portions, the rotating cams slide on and along the slopes formed at the end surfaces of the respective guide convex portions by the operation of the urging means, and whereby each rotating cam engages each shallow groove and the guide convex portion adjacent to the shallow groove. In such a manner, the movable member and the contact member engaging the rotating cam member are temporarily stopped at a predetermined position. When the pushing member is pushed again, the engaged cams are pushed by the reciprocating cams, the urging means operates at a position of the end surface of each guide convex portion, each rotating cam slides along a slope of an adjacent guide convex portion, and then the rotating cam slides along an adjacent deep groove to return to an initial condition.

In such a structure, because the stopping mechanism is simply constructed from a single guide cylinder, reciprocating cam member, rotating cam member and urging means such as a spring, the number of the parts may be small, and the multi-way valve can be assembled compactly and inexpensively.

Further, in a case where the rotation preventing member is provided in the valve casing, the contact member can be prevented from being rotated, and the spherical elements can be forcibly displaced at a stable condition to switch the fluid paths.

Further, in a case where the contact member comes into contact with a spherical surface of the spherical element at a position eccentric from a center of gravity of the spherical element toward the fluid outlet when the fluid outlet is opened, the spherical element fitting into the fluid outlet can be pushed up by a small force. As a result, the pushing member operating to move the contact member can also be operated by a small operating force.

Furthermore, in a case where the ratio of diameter of the spherical element to an inner diameter of the fluid outlet is set in the range of 1:0.3 to 1:0.8, a defect such as one caused when the difference between the diameter of the spherical element and the inner diameter of the fluid outlet is small, namely, where the spherical element is deeply fitted into the fluid outlet and a great force is required when opened, can be prevented. Moreover, where the inner diameter of the fluid outlet is extremely small, namely, the pressure loss of the multi-way valve itself becomes great and the flow rate remarkably decreases, also can be prevented.

Further objects, features, and advantages of the present invention will be understood from the detailed description of the preferred embodiment of the present invention with reference to the appropriate figures.

BRIEF DESCRIPTION OF THE DRAWINGS

Preferred exemplary embodiments of the invention will now be described with reference to the appropriate figures, which are given by way of example only, and are not intended to limit the present invention.

FIG. 30 is a sectional view of the bayonet mechanism shown in FIG. 28 for explaining another operation condition of the bayonet mechanism.

DETAILED DESCRIPTION OF THE PREFERRED EMBODIMENTS

Hereinafter, the preferred embodiments of the present invention will be explained with reference to the drawings.

Although the embodiments described hereinafter will be explained with respect to water purifiers incorporating multi-way valves according to the preferred embodiments of the present invention, of course, the multi-way valves can be applied to devices and apparatuses other than water purifiers, and uses of the multi-way valves are not limited to water purifiers.

FIGS. 1 to 7 show a water purifier using a multi-way valve according to a first embodiment of the present invention.

Figure 1:
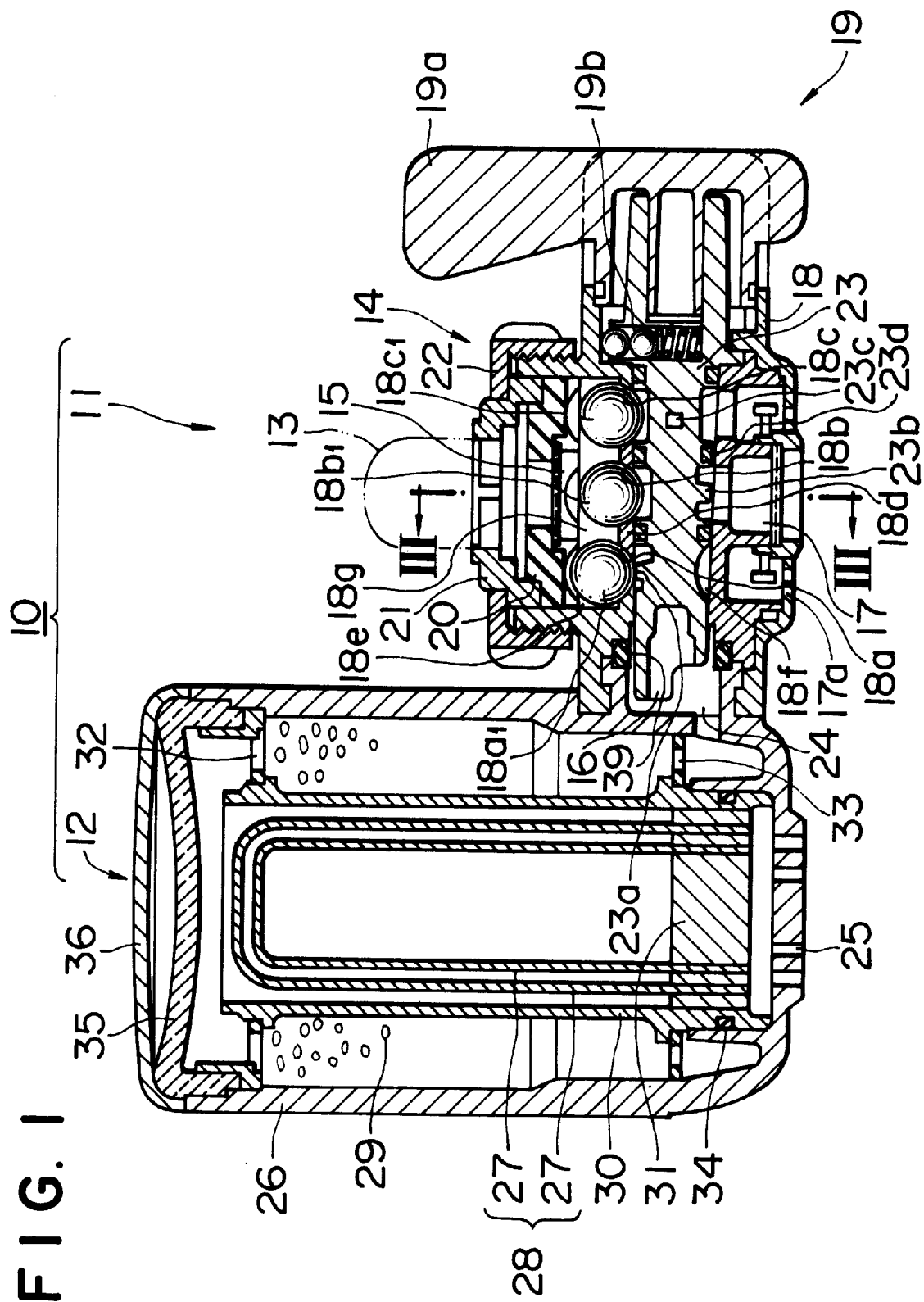
FIG. 1 is a vertical sectional view of a water purifier using a multi-way valve according to a first embodiment of the present invention.
Figure 2:
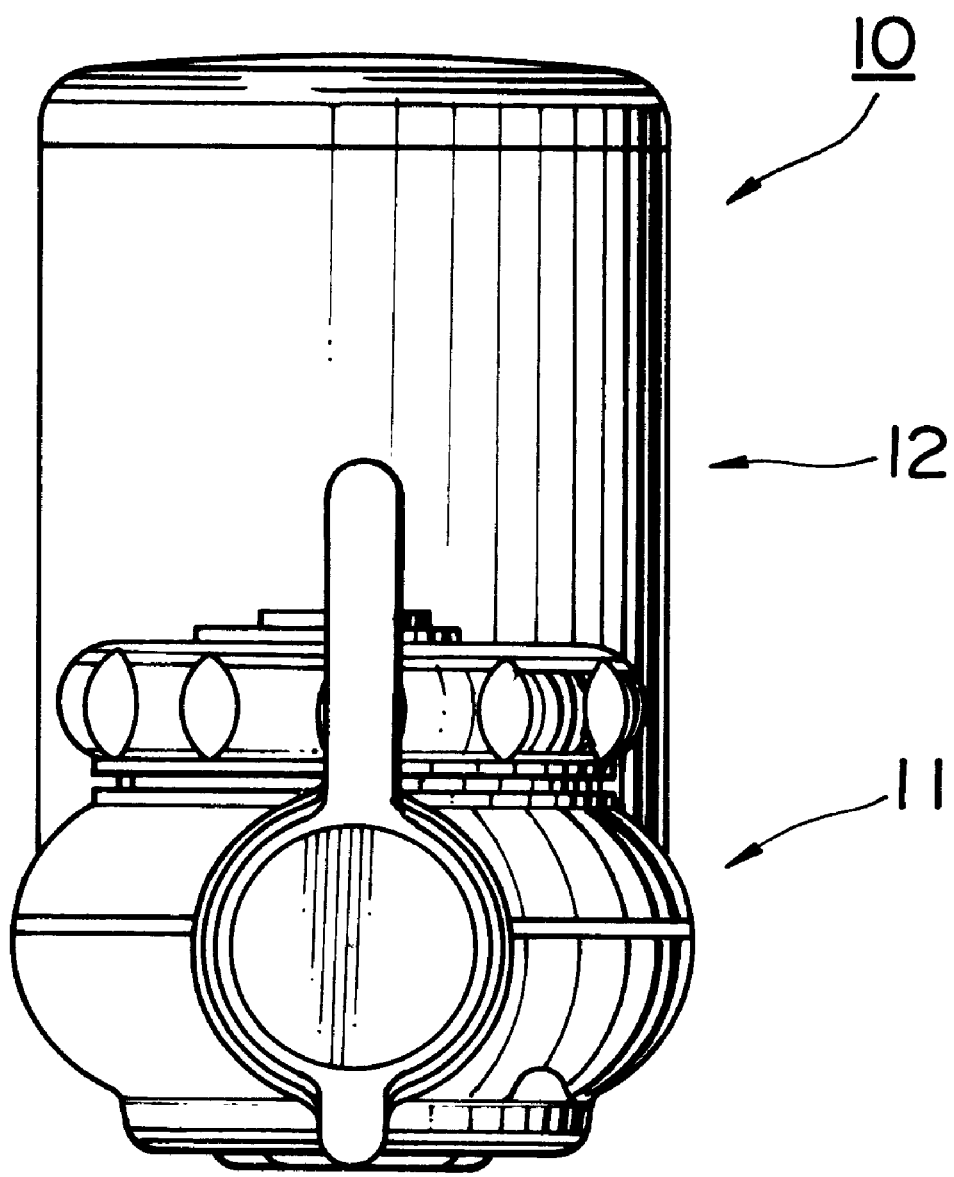
FIG. 2 is a right-hand side view of the water purifier shown in FIG. 1.
Figure 3:
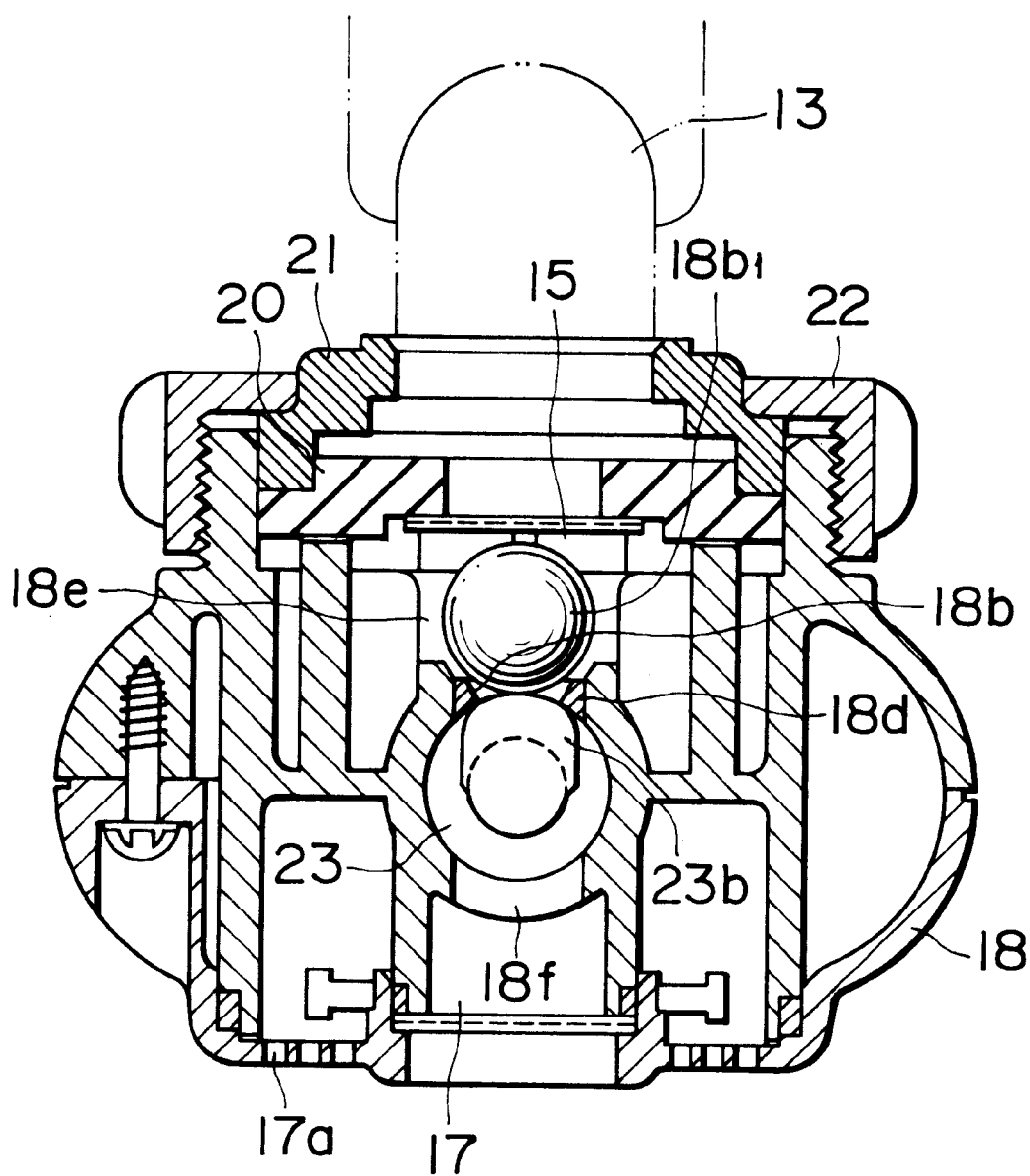
FIG. 3 is an enlarged vertical sectional view of the water purifier shown in FIG. 1, as viewed along III—III line of FIG. 1.

The water purifier 10 of FIG. 1 comprises a water purifier body (valve body) 11 comprising a multi-way valve which switches raw water from a faucet 13 to one of a plurality of outflow destinations, and an exchangeable cartridge-type filter device 12 (hereinafter, also referred to as "a filter containing cartridge" or merely "cartridge") provided for filtering the raw water introduced through the multi-way valve. The water purifier 10 is attached directly to the faucet 13 by a fastener 14 provided to the water purifier body 11.

The water purifier body 11 has a body 18, and the body 18 has a raw water inlet 15 which is a fluid inlet for the raw water intred from the faucet 13 at an upper position of the body, a raw water transfer port 16 for supplying the raw water to the filter containing cartridge 12 at a side position of the body, and a raw water supply port 17 for flowing out the raw water as it is and a shower supply port 17a for supplying the raw water as a shower of water at a lower position of the body. A switching valve 19 for switching the flow path of the raw water to a selected direction is provided in the body 18. The fastener 14 for connecting the body 18 to the faucet 13 is provided on an upper portion of the body 18. As shown in FIG. 1, the fastener 14 comprises a ring-like rubber packing 20, a presser ring 21 and a cap 22, and the fastener 14 has a structure in which it can connect the body 18 to the faucet 13 by fastening a female screw defined in the cap 22 and a male screw defined on the body 18 so that water leakage does not occur.

The interior of the body 18 is divided into and separated to an upper chamber 18e formed as a first chamber and a lower chamber 18f formed as a second chamber by a partition 18d. Three water paths 18a, 18b and 18c (fluid paths) are provided in the partition 18d, and the respective water paths 18a, 18b and 18c extend in parallel to a spool shaft 23 of the switching valve 19 formed from a multi-way valve. The raw water inlet 15 is provided to the upper chamber 18e and the inlet communicates with the upper chamber 18e. The raw water transfer port 16, the raw water supply port 17 and the shower supply port 17a provided as three raw water outlets are provided to the lower chamber 18f and the respective ports communicate with the lower chamber 18f. Three spherical valve elements $18a_1$, $18b_1$ and $18c_1$ are provided in the upper chamber 18e such that the respective valve elements can engage the respective corresponding water paths 18a, 18b and 18c at a liquid hermetic sealing condition and the lower end portions of the respective valve elements can project into the interior of the lower chamber 18f for engaging with the respective water paths. Therefore, when the valve elements $18a_1$, $18b_1$ and $18c_1$ are taken off for checking or exchanged, the work therefor can be performed very easily by removing the fastener 14 from the body 18 and opening the upper chamber 18e from the upper side.

Figure 4:
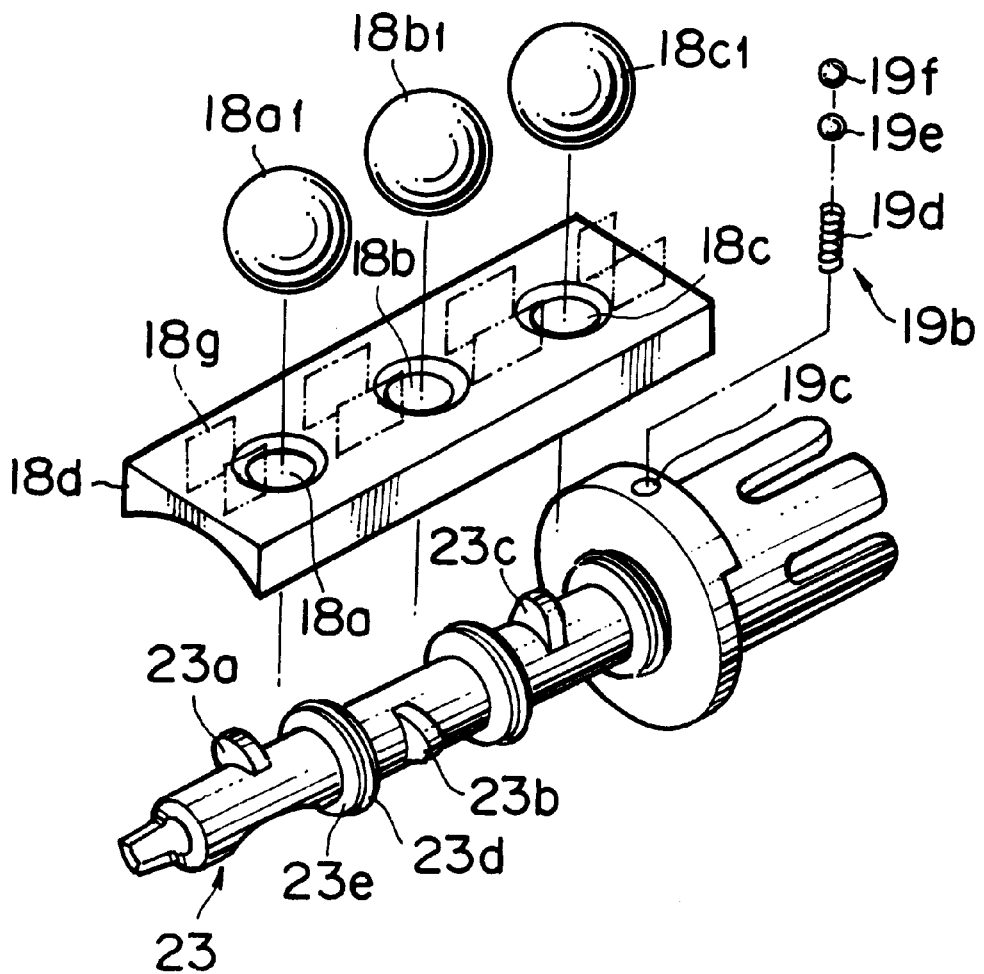
FIG. 4 is an exploded perspective view of a part of the multi-way valve shown in FIG. 1.

In the switching valve 19, as shown also in FIG. 4, ring walls 23e are formed on the spool shaft 23 and seal rings 23d are provided on the respective ring walls 23e. By engaging the seal rings 23d with the inner surface of the lower chamber 18f with liquid hermetic sealing, the water paths 18a, 18b and 18c are connected with the raw water transfer port 16, the raw water supply port 17 and the shower supply port 17a, respectively, as well as the respective communicating paths are capable of being separated from each other. Cams 23a, 23b and 23c are provided on the spool shaft 23 at predetermined positions of the spool shaft 23 (positions predetermined in correspondence with the respective water paths) for pushing up corresponding valve elements. Each of these cams 23a, 23b and 23c can selectively push a corresponding valve element upwardly by rotating the spool shaft 23 at an angle of, for example, 90 degrees. The amount of pushing of a valve element may be set to be in the range of 1 to 2 mm for ensuring flowing of a sufficient amount of water through a water path. Therefore, the body 18 having the upper chamber 18e and the lower chamber 18f can be formed small-sized, and ultimately, the amount of resident water can be decreased to realize a better condition or hygienic property.

A selected valve element among the valve elements $18a_1$, $18b_1$ and $18c_1$ is pushed up by rotating the spool shaft 23 at a predetermined angle by the operation of a switching lever 19a to open a corresponding water path, and the raw water inlet 15 can be selectively connected to one or another of the raw water transfer port 16, the raw water supply port 17 and the shower supply port 17a.

A click stopping mechanism 19b is provided to the spool shaft 23 for easily setting a predetermined position of the spool shaft 23. The click stopping mechanism 19b comprises a spring 19d inserted into a hole 19c defined on the spool shaft 23 and two balls 19e and 19f urged by the spring 19d.

Supporting plates 18g are provided on the partition 18d, and the supporting plates 18g prevent the valve elements $18a_1$, $18b_1$ and $18c_1$ from being moved laterally.

Figure 5:
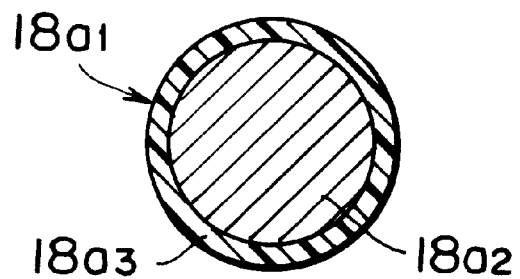
FIG. 5 is an enlarged sectional view of a valve element of the multi-way valve shown in FIG. 1.

As shown in FIG. 5, each valve element (shown as valve element $18a_1$ in FIG. 5) preferably comprises a core $18a_2$ composed of, for example, a steel ball, and an elastic material layer $18a_3$ covering the whole surface of the core $18a_2$ and having a thickness of about 0.5 to 1 mm. In such a valve element, the sealing ability due to the valve element and the durability of the valve element and the valve seat therefor can be greatly improved. The valve element may be formed as a cone shape or a cylinder shape, and the elastic material layer $18a_3$ may not be provided in a case where sufficiently good sealing ability and durability can be ensured without the elastic material layer. Where, as the material of the elastic material layer $18a_3$, a rubber such as a nitrile rubber, an ethylene-propylene rubber, a fluoro rubber, a silicone rubber and a butyl rubber can be appropriately employed, and particularly, a rubber having a rubber hardness of 50 to 90 degrees can be adequately employed. The other valve elements $18b_1$ and $18c_1$ can be formed similarly.

The filter-containing cartridge 12 has a container 26 having a raw water inflow port 24 at a side portion thereof and a plurality of shower ports 25 (a filtered water supply port) at a bottom portion thereof. In the container 26, a U-shaped hollow fiber bundle 28 formed from a plurality of hollow fibers the open ends of which are set so as to face the filtered water supply port 25, and an adsorbent layer 29 charged between the outer surface of a cylindrical member 30 which is provided in the container 26 and the inner surface of the container 26, are contained. As the adsorbent of the adsorbent layer 29, preferably an activated carbon, a zeolite, an ion exchange resin or a xylene resin is used.

The hollow fiber bundle 28 is provided in the cylindrical member 30 which is provided in the container 26 and whose both ends are opened. The respective hollow fibers of the hollow fiber bundle 28 are bent U-shaped and both ends of the respective hollow fibers are potted on a synthetic resin member 31 provided at a lower position of the cylindrical member 30 so that the both ends can open downward. The upper portion of the cylindrical member 30 is fixed to the inner surface of the container 26 via a filter 32, and the lower portion thereof is fixed in the container 26 via a filter 33 provided with a plurality of holes at a concentric circle condition to a center of the cylindrical member 30 and an O-ring 34 so that the open ends of the respective hollow fibers face the filtered water supply port 25.

A transparent lid 35 is provided at an upper portion of the container 26 so that the hollow fiber bundle 28 and the adsorbent layer 29 can be easily charged and the degree of dirtiness of the hollow fiber bundle 28 can be easily observed from outside. An opaque cover 36 is provided on the transparent lid 35, free to be attached to and detached from the container 26 so that a double covering structure can be formed.

In the cartridge 12 thus constructed, a path of water to be filtered is formed from the raw water inflow port 24 to the filtered water supply port 25 through the adsorbent layer 29 and the hollow fiber bundle 28. The filter containing cartridge 12 is thus constructed integrally. The filter containing cartridge 12 is connected to the water purifier body 11 by a bayonet mechanism described below via a ring-like rubber packing 39, and the body 11 is connected to the faucet 13 to form the water purifier 10.

Figure 6:
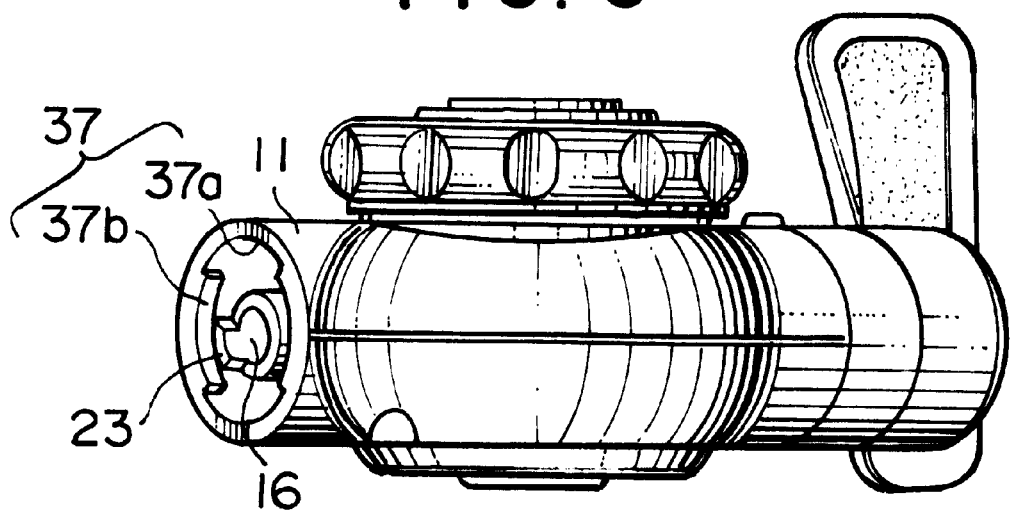
FIG. 6 is a perspective view of a part of the water purifier shown in FIG. 1, showing a bayonet mechanism employed for the main body side of the water purifier.
Figure 7:
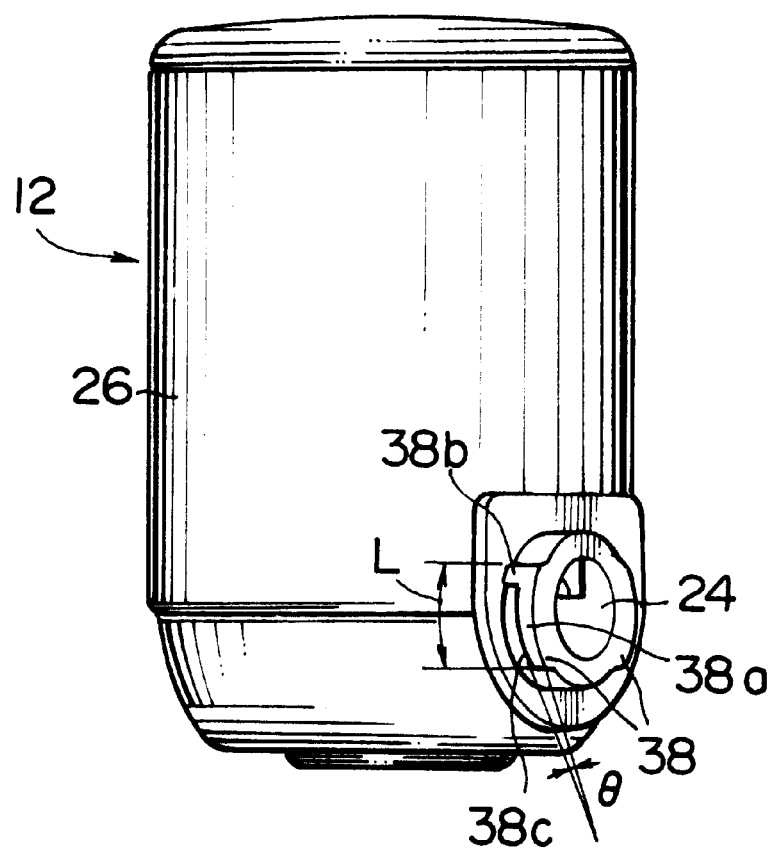
FIG. 7 is a perspective view of a part of the water purifier shown in FIG. 1, showing a bayonet mechanism employed for the filter device side of the water purifier.

The bayonet mechanism is constructed as shown in FIGS. 6 and 7. The bayonet mechanism comprises a concave portion 37 formed at a side position of the body 18 corresponding to the position of the left-hand end portion of the spool shaft 23 in the water purifier body 11, and a convex portion 38 formed on the periphery of the raw water inflow port 24 of the filter containing cartridge 12, and it is an attachment and detachment mechanism wherein the concave portion 37 and the convex portion 38 are engaged to each other. The positions formed with the concave portion 37 and the convex portion 38 may be contrary to the above-described positions, wherein a concave portion is formed in the cartridge side and a convex portion is formed on the water purifier body side. As shown in FIG. 7, the convex portion 38 is formed on the periphery of the raw water inflow port 24 as a pair of portions, in this embodiment. Each convex portion 38 has a tapered screw portion 38a having a predetermined length in the circumferential direction of the raw water inflow port 24 in which the thickness in the axial direction varies at a taper angle of $\theta$ in the circumferential direction of the raw water inflow port 24, and a stopper 38b connected to the tapered screw portion 38a and extending in the axial direction of the screw of the tapered screw portion 38a. Although the tapered screw portion 38a is formed as a pair of portions in this embodiment, it may be formed as two or more pairs of portions. If formed as two or more pairs of portions, there is an advantage capable of decreasing the rotational angle required for fixing the filter containing cartridge 12 to the water purifier body 11.

The concave portion 37 comprises notched portions 37a each having a circumferential length greater than the length L of the sum of the tapered screw portion 38a and the stopper 38b, and female screw portions 37b each engaging a corresponding tapered screw portion 38a and having a predetermined length. Both the convex portions 38 are inserted into the respective notched portions 37a of the concave portion 37, the cartridge 12 is rotated after the insertion, and the tapered surfaces 38c of the tapered screw portion 38a are slid along the respective female screw portions 37b and engaged with the female screw portions 37b. When the end portions of the female screw portions 37b are brought into contact with the respective stoppers 38b, the fastening operation is completed. In this embodiment, the stoppers 38b are disposed at positions such that the cartridge 12 is stood up in a vertical direction as shown in FIG. 1 when the end portions of the female screw portions 37b are brought into contact with the respective stoppers 38b.

In the water purifier 10 thus constructed of this embodiment, the water purifier body 11 and the filter containing cartridge 12 are supposed to be connected at the states shown in FIGS. 6 and 7. In this condition, when the position of the switching lever 19a is observed from the right-hand side of FIG. 6, it is at the 12 o'clock position.

Firstly, when the switching lever 19a is rotated in a clockwise direction to the 3 o'clock position, the raw water, supplied from the faucet 13 and flowing into the valve from the raw water inlet 15, flows through the water path 18b opened by pushing up the valve element $18b_1$ by the operation of the cam 23b of the spool shaft 23 and through the position of the spool shaft 23, and flows out from the raw water supply port 17 as a straight flow water.

When the switching lever 19a is rotated in a counter-clockwise direction to be returned to 12 o'clock position, the valve element $18b_1$ is released from the cam 23b of the spool shaft 23 and settles on its valve seat whereby the water path 18b is closed. Instead, the valve element $18c_1$ is pushed up by the cam 23c of the spool shaft 23 and the water path 18c is opened. The raw water introduced from the raw water inlet 15 flows through the water path 18c and through the position of the spool shaft 23, and the flow of the water supplied is switched to a shower flow and flows out the shower supply port 17a.

When the switching lever 19a is further rotated in the same counterclockwise direction at an angle of 90 degrees to be set to the 9 o'clock position, the valve element $18a_1$ is pushed up by the cam 23a of the spool shaft 23 and the water path 18a is opened. The water path is switched, and the raw water introduced from the raw water inlet 15 is supplied to the raw water transfer port 16 through the water path 18a. The raw water having reached the raw water transfer port 16 is supplied to the raw water inflow port 24 of the filter containing cartridge 24. At that time, because the filter containing cartridge 24 and the water purifier body 11 are securely connected to each other at a contact condition by the bayonet mechanism via the ring-like rubber packing 39, the water does not leak from this portion, and flows through this portion smoothly. The raw water supplied to the raw water inflow port 24 passes from the filter 33 through the adsorbent layer 29 and the hollow fiber bundle 28 in this order, and the water is filtered in this portion and the filtered water flows out from the filtered water supply port 25 as a purified water.

Next, a water purifier using a multi-way valve according to a second embodiment of the present invention will be explained with reference to FIGS. 8 to 20. In this embodiment, a water purifier having a ball-type multi-way valve, attached to, for example, a faucet for homes, will be explained.

Figure 8:
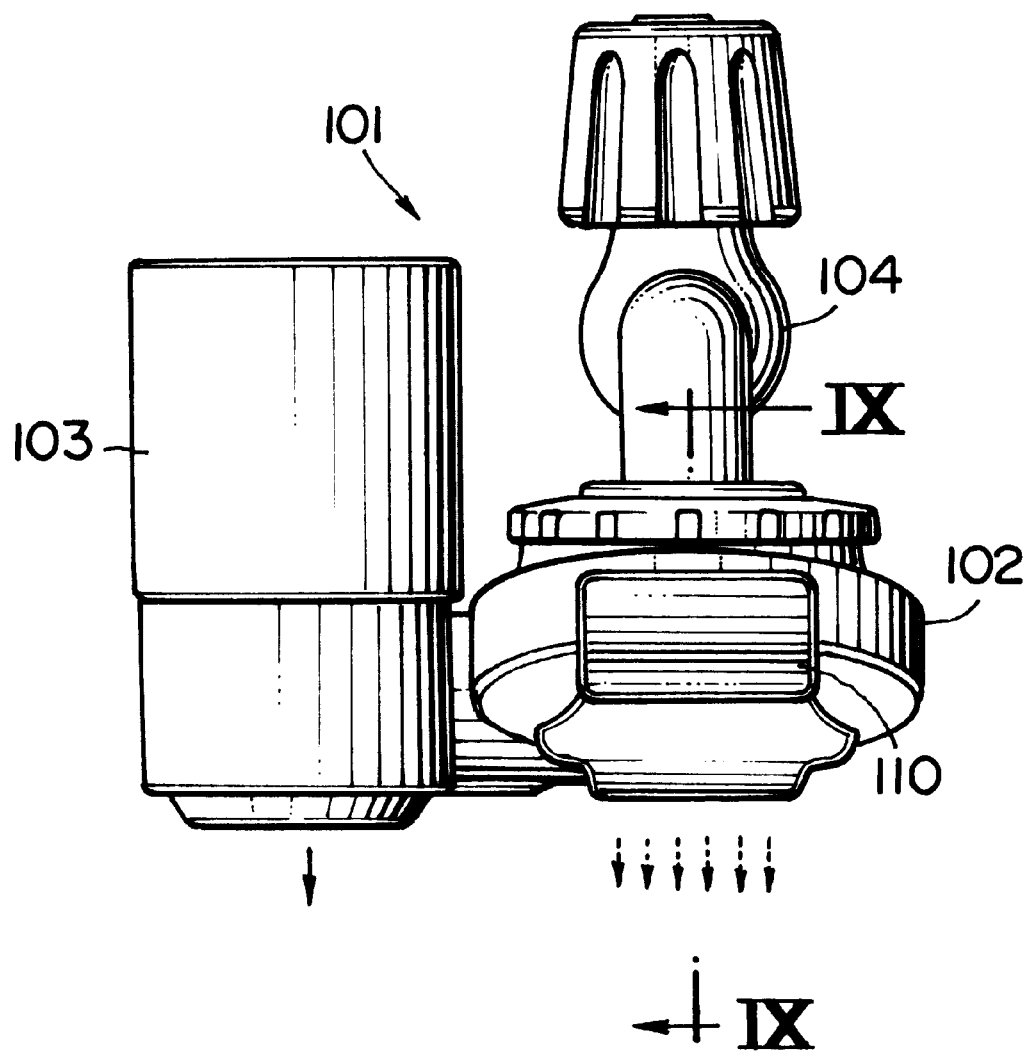
FIG. 8 is an elevational view of a water purifier according to a second embodiment of the present invention.

As shown in FIG. 8, the water purifier 101 comprises a valve body 102 (hereinafter, also referred to as merely "a body") incorporated with a multi-way valve 105 therein and a filter device 103 containing a filter material, and a faucet 104 is attached to the upper portion of the body 102. Because the filter device 103 has substantially the same structure as that of the filter containing cartridge of the aforementioned first embodiment, the structure of the filter device 103 of this embodiment is only briefly explained later. The raw water introduced from the faucet 104 is supplied from the outlet of the body 102 as it is as shown by broken line arrows in FIG. 8, and the water filtered by the filter device 103 is supplied from the outlet of the filter device 103 as a purified water as shown by a solid line arrow in FIG. 8.

Figure 9:
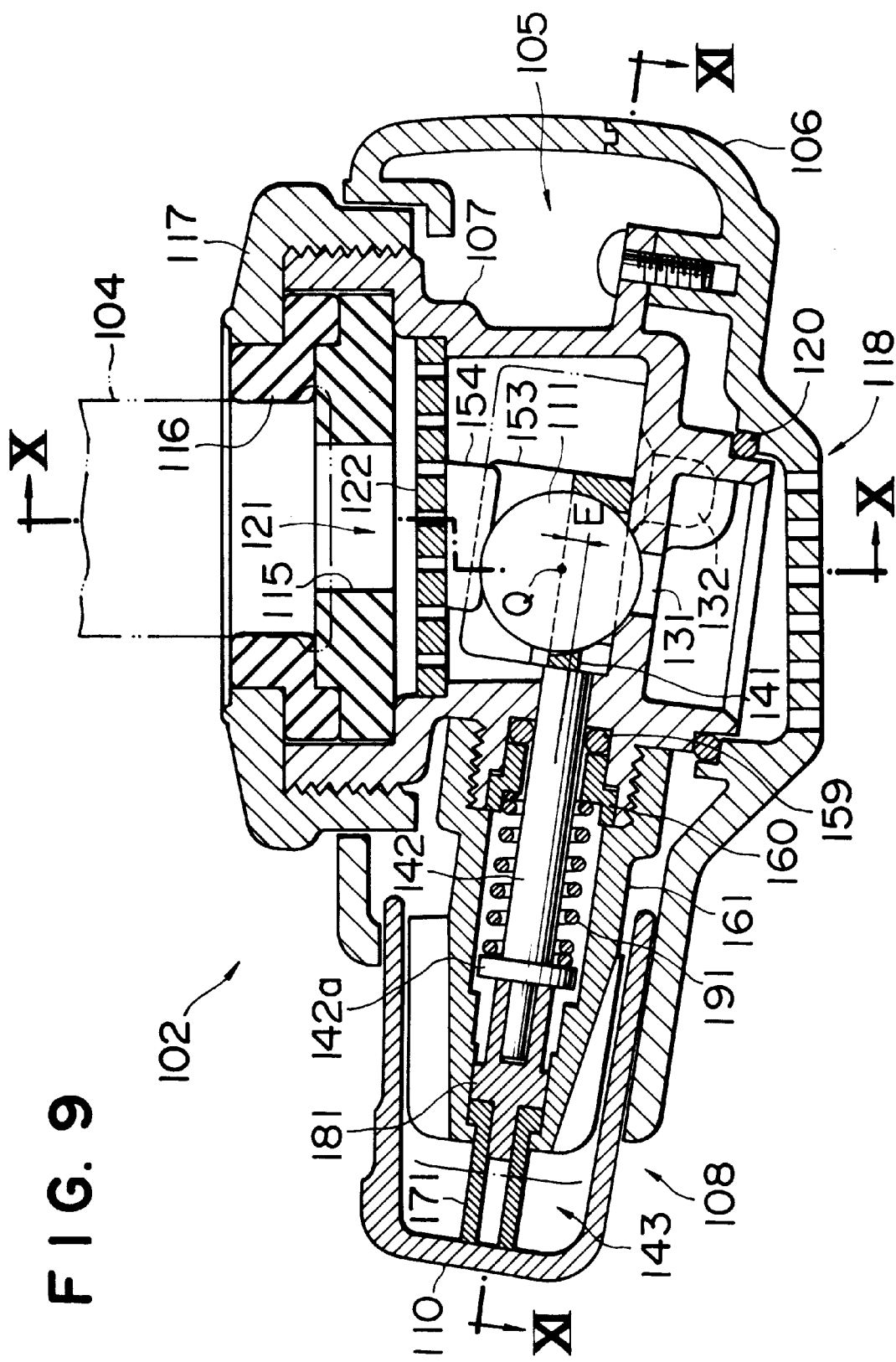
FIG. 9 is an enlarged vertical sectional view of the water purifier shown in FIG. 8, as viewed along IX—IX line of FIG. 8.
Figure 10:
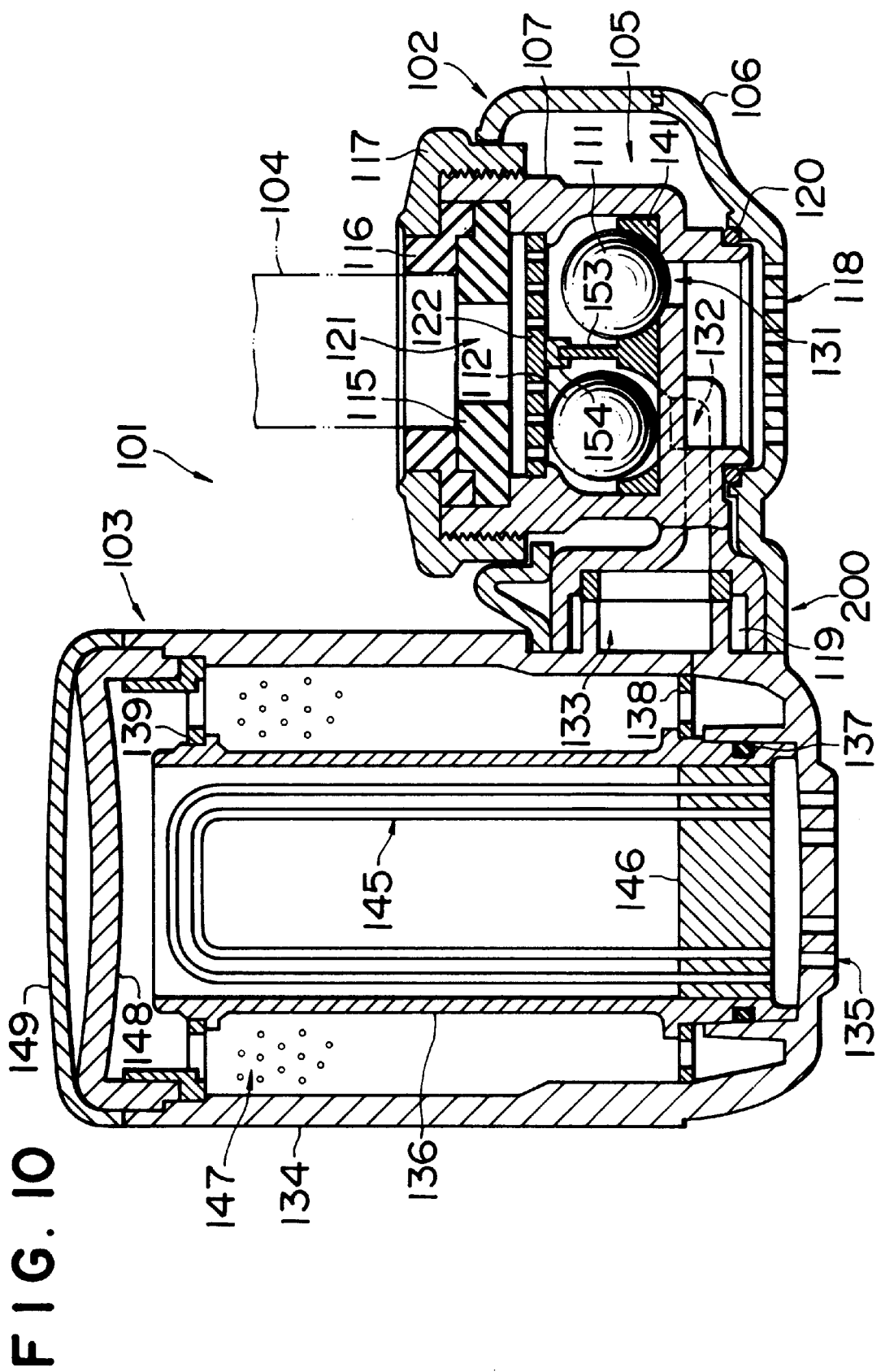
FIG. 10 is a vertical sectional view of the water purifier shown in FIG. 9, as viewed along X—X line of FIG. 9.
Figure 11:
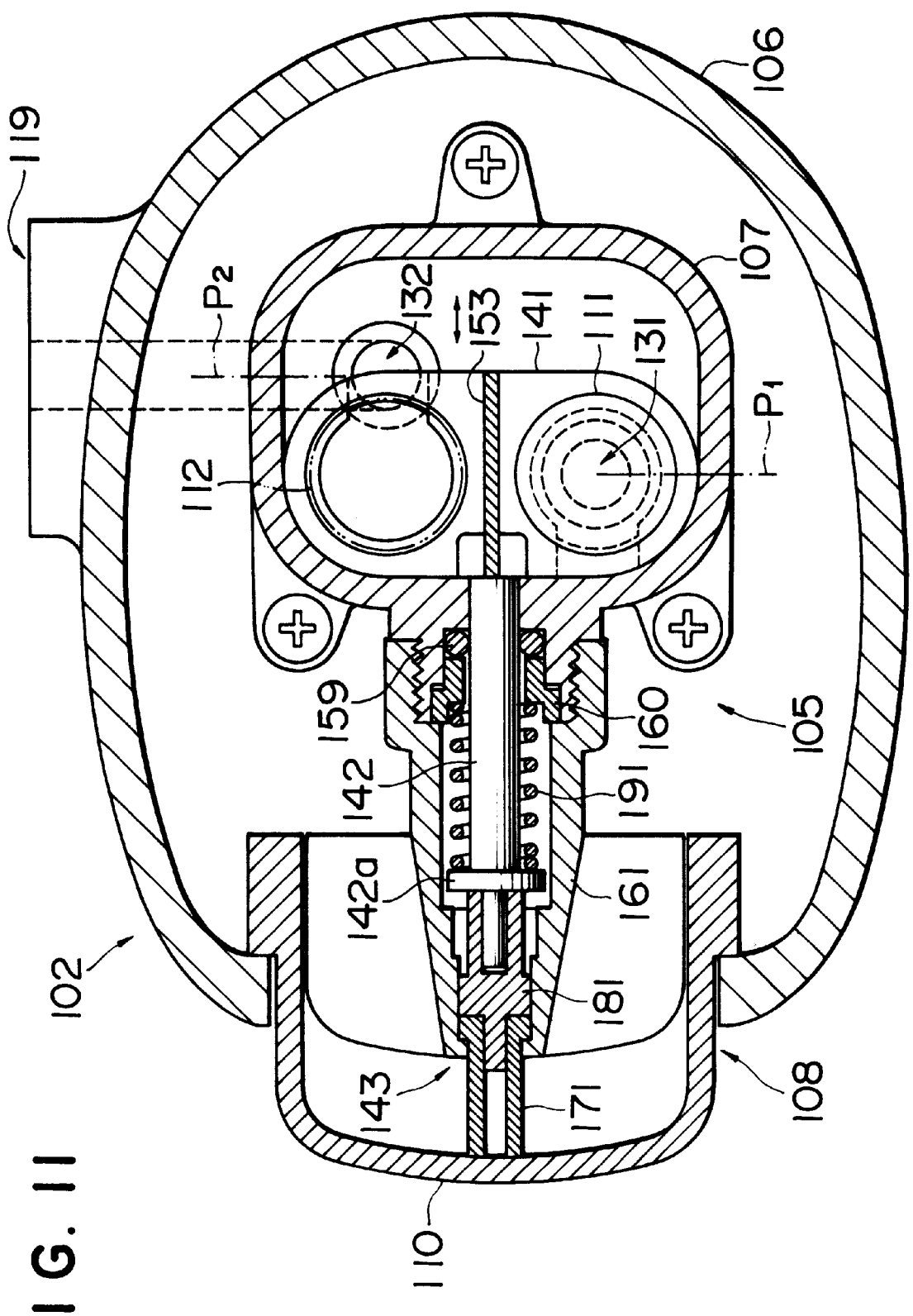
FIG. 11 is a cross-sectional view of the water purifier shown in FIG. 9, as viewed along XI—XI line of FIG. 9.

As shown in FIGS. 9 to 11, the body 102 has a valve structure comprising a valve casing 107 provided in a housing 106, two balls 111 and 112 (spherical elements) provided in the valve casing 107, and a valve operating portion 108 for operating the balls 111 and 112 by a push button 110 provided as a pushing member at a front position of the housing 106. Hereinafter, the ball 111 is also referred to as a first ball, and the ball 112 is also referred to as a second ball.

The upper portion of the valve casing 107 projects from the upper opening of the housing 106, and the bottom portion thereof extends frontward and slightly upward and fixed to the housing 106 by screw fastening. A ring-like packing 115 is fitted into the stepped portion formed in the upper portion of the valve casing 107. The water purifier 111 is attached to the faucet 104 by providing split ring 116 above a radially protruded portion shown by a two-dot chain line in FIG. 9 and fastening the split ring 116 and screwing an attachment nut 117 onto the upper portion of the valve casing 107 via the split ring 116.

In the lower portion of the housing 106, as shown in FIG. 10, a shower discharge port 118 for discharging the raw water introduced from the faucet 104 as it is, and a raw water transfer port 119 for supplying the introduced raw water to the filter device 103 are provided. Namely, the ball-type multi-way valve 105 provided in the water purifier 101 of this embodiment switches the water paths to the shower discharge port 118 for using the raw water introduced from the faucet 104 as it is and to the raw water transfer port 119 for supplying the introduced raw water to the filter device 103 and purifying the raw water by the filter device 103. A packing 120 is interposed between the valve casing 107 and the housing 106 at an inside position of the shower supply port 118.

Hereinafter, the valve mechanism of the multi-way valve 105 will be explained.

A plate member 122 having many small through holes is fitted to a raw water inlet 121 of the valve casing 107. As shown in FIGS. 9 and 11, a first outlet 131 communicating with the shower discharge port 118 and a second outlet 132 communicating with the raw water transfer port 119 are provided on the bottom portion of the valve casing 107, and the outlets 131 and 132 are opened at positions shifted from each other in the frontward/rearward direction. The power of the raw water introduced from the faucet 104 is reduced by the plate member 122 attached to the raw water inlet 121, and the raw water is conducted into the interior of the valve casing 107 smoothly. When the power of the raw water is not too strong, it is not particularly necessary to provide the plate member 122.

The first ball 111 for opening and closing the first outlet 131 and the second ball 112 for opening and closing the second outlet 132 are contained in the valve casing 107. In this embodiment, the first and second balls 111 and 112 are formed from a rubber such as a nitrile rubber, a silicone rubber, a fluoro rubber or an ethylene-propylene rubber. The hardness of the rubber is preferably in the range of 40 to 90 degrees, and such a rubber, which is an elastic material, has good sealing ability. The ratio of diameter of the first or second ball 111 or 112 to the inner diameter of the first or second outlet 131 or 132 is preferably in the range of 1:0.3 to 1:0.8 so that the ball is not fitted deeply into the outlet and the pressure loss of the outlet is not great. The material of the first and second ball 111 and 112 is not particularly restricted to a rubber, and it may be a metal such as a steel, a stainless steel or an aluminum, a plastic such as an ABS resin or a polypropylene, or a ceramic. In a case where the ball is constructed from a relatively hard material such as a metal or a ceramic, it is preferred that a rubber is attached to a portion of the valve casing 107 which comes into contact with the ball when the outlet is closed by the ball, thereby obtaining good sealing. Further, if a metal core is contained in the ball, the weight of the ball is increased, and the sealing ability can be improved by the sealing operation due to the increased self-weight of the ball in addition to pressure of supplied raw water.

Figure 12:
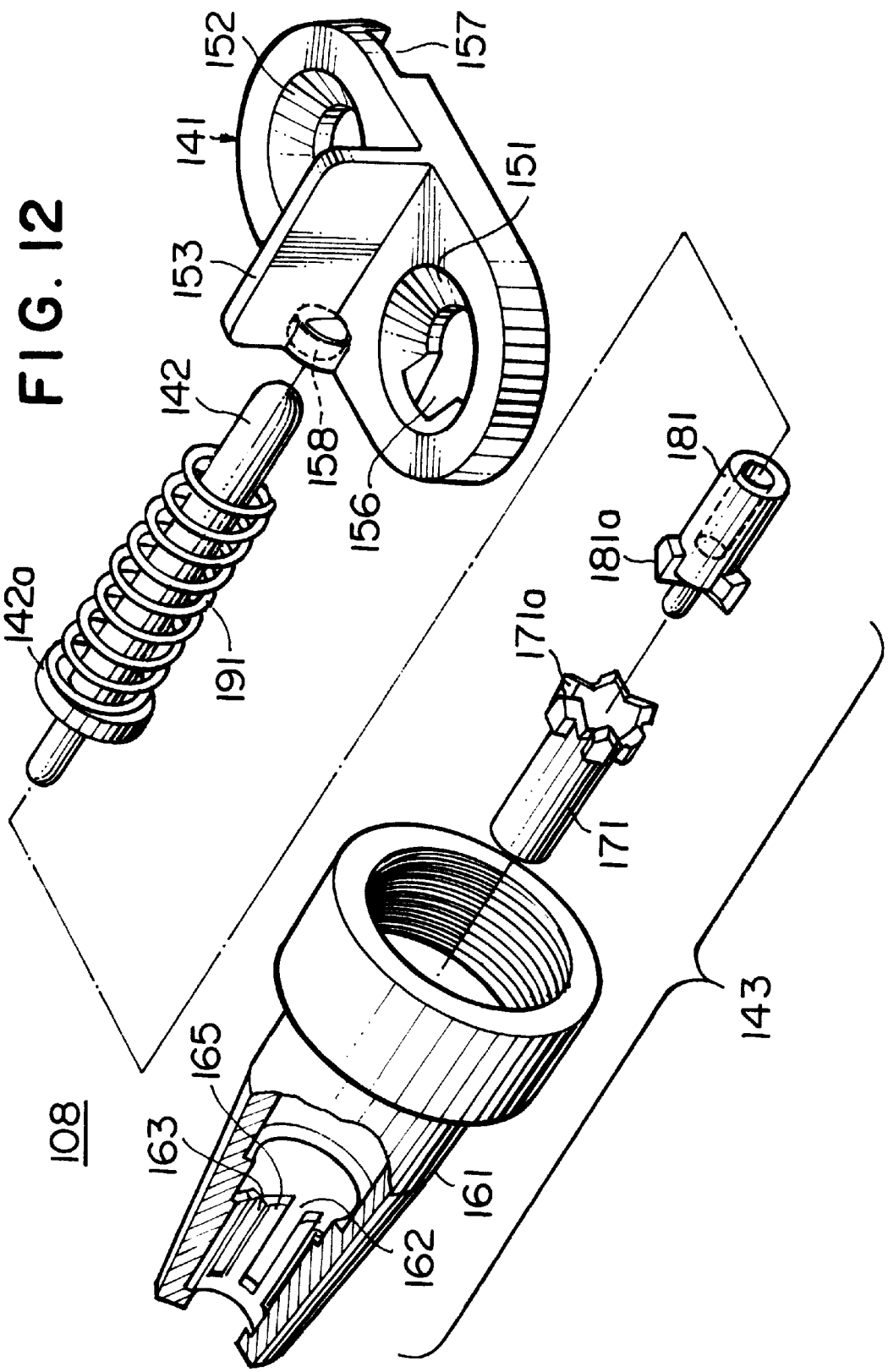
FIG. 12 is an exploded perspective view of a part of a multi-way valve incorporated in the water purifier shown in FIG. 9.

Next, the valve operating portion 108 will be explained with reference to FIG. 12. FIG. 12 is an exploded perspective view showing the valve operating portion 108 removing the push button 110.

As shown in FIG. 12, the valve operating portion 108 comprises a contact member 141 coming into contact with the first and second balls 111 and 112 and holding the balls in the valve casing 107, a push button 110 provided at a position in front of the housing 106 (FIGS. 9 and 11), a movable member 142 capable of reciprocating in the frontward and rearward directions for transmitting the displacement of the push button 110 due to pushing operation to the contact member 141, and a stopping mechanism 143 interposed between the push button 110 and the movable member 142 for temporarily stopping the movement of the movable member 142 at a predetermined position.

As shown in FIGS. 9 to 12, the contact member 141 supports the first and second balls 111 and 112 in a condition where the balls can roll, and the contact member 141 is slid on the inner lower surface of the valve casing 107 in the frontward and rearward directions. A first shaped supporting hole 151 and a second shaped supporting hole 152 are defined on the contact member 141, and the first and second balls 111 and 112 are inserted into and held in the first and second shaped supporting holes 151 and 152, respectively. By the sliding motion of the contact member 141 in the frontward and rearward directions, one of the first and second balls 111 and 112 is fitted into one of the first and second outlets 131 and 132 shifted in position to close the one of the outlets 131 and 132, while the other ball opens the other outlet.

A rotation preventing projected portion 153 is formed on the upper surface of the contact member 141, and this projected portion 153 is inserted into a rotation preventing concave portion 154 provided on the lower surface of the plate member 122 attached to the raw water inlet 121 in a condition free to slide. By such a rotation preventing mechanism, the rotation of the contact member 141 can be prevented during the sliding operation described later, and the contact member 141 can be slide in a stable condition. Notched portions 156 and 157 are formed on the lower surface of the contact member 141 at positions of edge portions of the first and second supporting holes 151 and 152, respectively, to facilitate the outflow operations of the raw water to the respective outlets 131 and 132. Further, a connection hole 158 is provided on the front surface of the contact member 141 for the connection of the contact member 141 and the reciprocating movable member 142.

Figure 13:
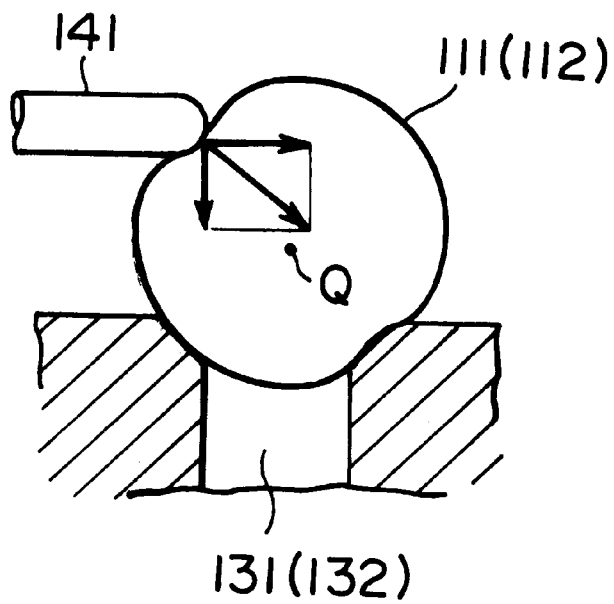
FIG. 13 is a schematic view showing a undesirable condition of contact of a member and an element in the multi-way valve incorporated in the water purifier shown in FIG. 9.

The axis of the movable member 142 is disposed at a position that is eccentric relative to the center of gravity Q of ball 111 or 112 toward the outlets 131 and 132 by an amount E (shown in FIG. 9), and the contact member 141 comes into contact with the ball 111 or 112 at a surface portion thereof that is eccentric relative to the center of gravity Q of ball 111 or 112 toward the outlets 131 and 132. As a result, the contact member 141 can push up the ball 111 or 112 fitted into the outlet 131 or 132 by a relatively small operating force and can switch the outlet 131 or 132 from a closed condition to an opened condition by a relatively small operating force. As shown in FIG. 13, if the contact member 141 came into contact with the ball 111 or 112 at an upper surface position relative to the center of gravity Q of the ball 111 or 112 and operated, because a force directed downward operates (shown by arrows in FIG. 13) to press the ball onto the outlet, an unnecessarily great force would be required even if the outlet could be opened. FIG. 13 is shown as exaggerating the deformation of the ball 111 (112).

Figure 14:
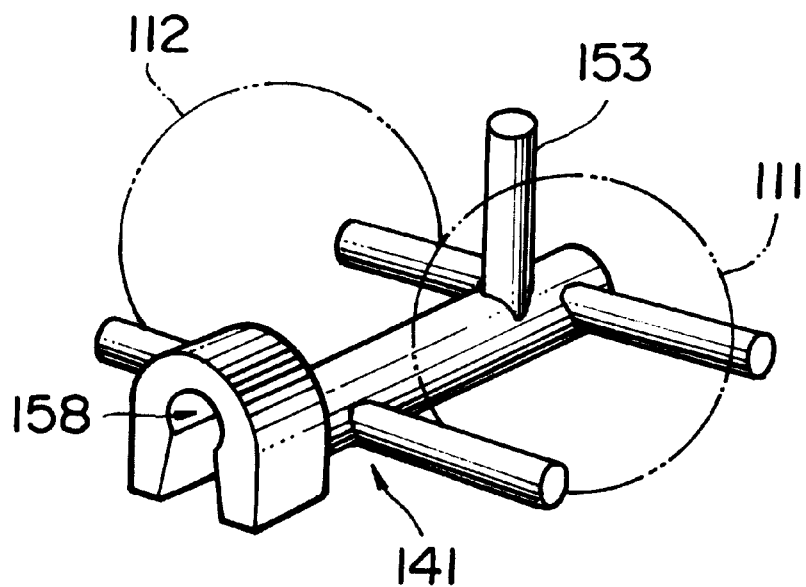
FIG. 14 is a perspective view of a contact member according to a modification of the multi-way valve incorporated in the water purifier shown in FIG. 9.
Figure 15:
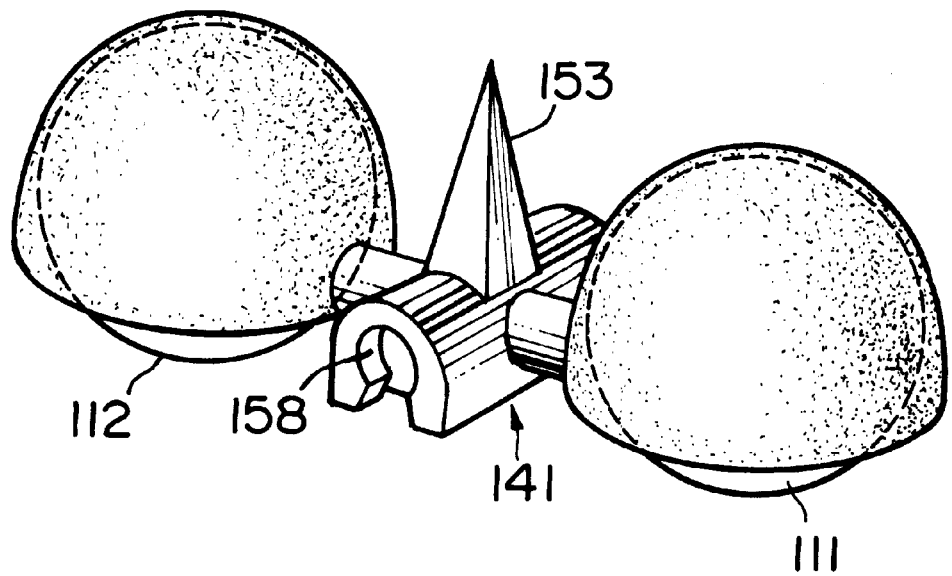
FIG. 15 is a perspective view of a contact member according to another modification of the multi-way valve incorporated in the water purifier shown in FIG. 9.

The contact member 141 may be modified to various formations, and for example, it may be formed as a branch-like shape as shown in FIG. 14, or may be formed as a cap-like shape as shown in FIG. 15. Further, the rotation preventing projected portion 153 may be modified to a rod-like portion or a cone-like portion as shown in FIGS. 14 and 15. Furthermore, although the rotation preventing projected portion 153 and the rotation preventing concave portion 154 are provided to operate at an upper portion of the contact member 141 in the above-described embodiment, they may be disposed at a position on a side or bottom surface of the contact member 141.

As shown in FIGS. 9 and 12, the movable member 142 (reciprocating movable member) for sliding the contact member 141 in frontward and rearward directions is slidably inserted into the front surface side of the valve casing 107, and the tip portion thereof is fitted into the connection hole 158 formed on the front surface of the contact member 141 to integrally assemble the contact member 141 and the movable member 142. The condition shown in FIG. 11 is a condition where the first outlet 131 is closed by the first ball 111 and the second outlet 132 is opened in the process wherein the movable member 142 and the contact member 141 are moved reciprocatively, and this is referred to as "a first stop position $P_1$". The movable member 142 is moved rearward (in the right-hand direction in FIG. 11) via a temporarily stopping mechanism 143 described later by the pushing operation of the push button 110, and in response to this operation, the contact member 141 forcibly displaces the first ball 111 from the first outlet 131 to open the first outlet 131 while the second ball 112 is fitted into the second outlet 132 to close the second outlet 132. This position is referred to as "a second stop position $P_2$". The portion at which the movable member 142 is inserted into the valve casing 107 is sealed by a packing 159, and the packing 159 is fixed via a collar 160 by a guide cylinder 161 of the temporary stopping mechanism 143 described below.

The stopping mechanism 143 comprises a guide cylinder 161 screwed into and fixed to the front surface portion of the valve casing 107, a reciprocating cam member 171 with reciprocating cams 171a which is inserted into the inner tip portion of the guide cylinder 161 and brought into contact with the push button 110, a rotating cam member 181 having rotating cams 181a engaging the reciprocating cams 171a of the reciprocating cam member 171 and engaged with the other end portion of the movable member 142, and a spring 191 (urging means) for urging the movable member 142 in the frontward direction (in a direction toward the rotating cam member 181). This stopping mechanism 143 is provided for temporarily stopping the contact member 141 via the movable member 142 at the above-described first stop position $P_1$ and second stop position $P_2$, respectively.

Figure 16:
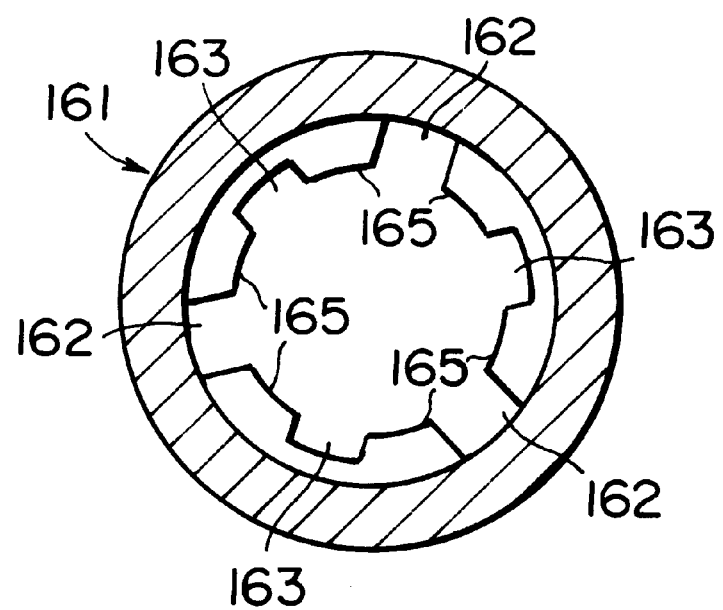
FIG. 16 is an enlarged vertical sectional view of a guide cylinder of the multi-way valve incorporated in the water purifier shown in FIG. 9.
Figure 17:
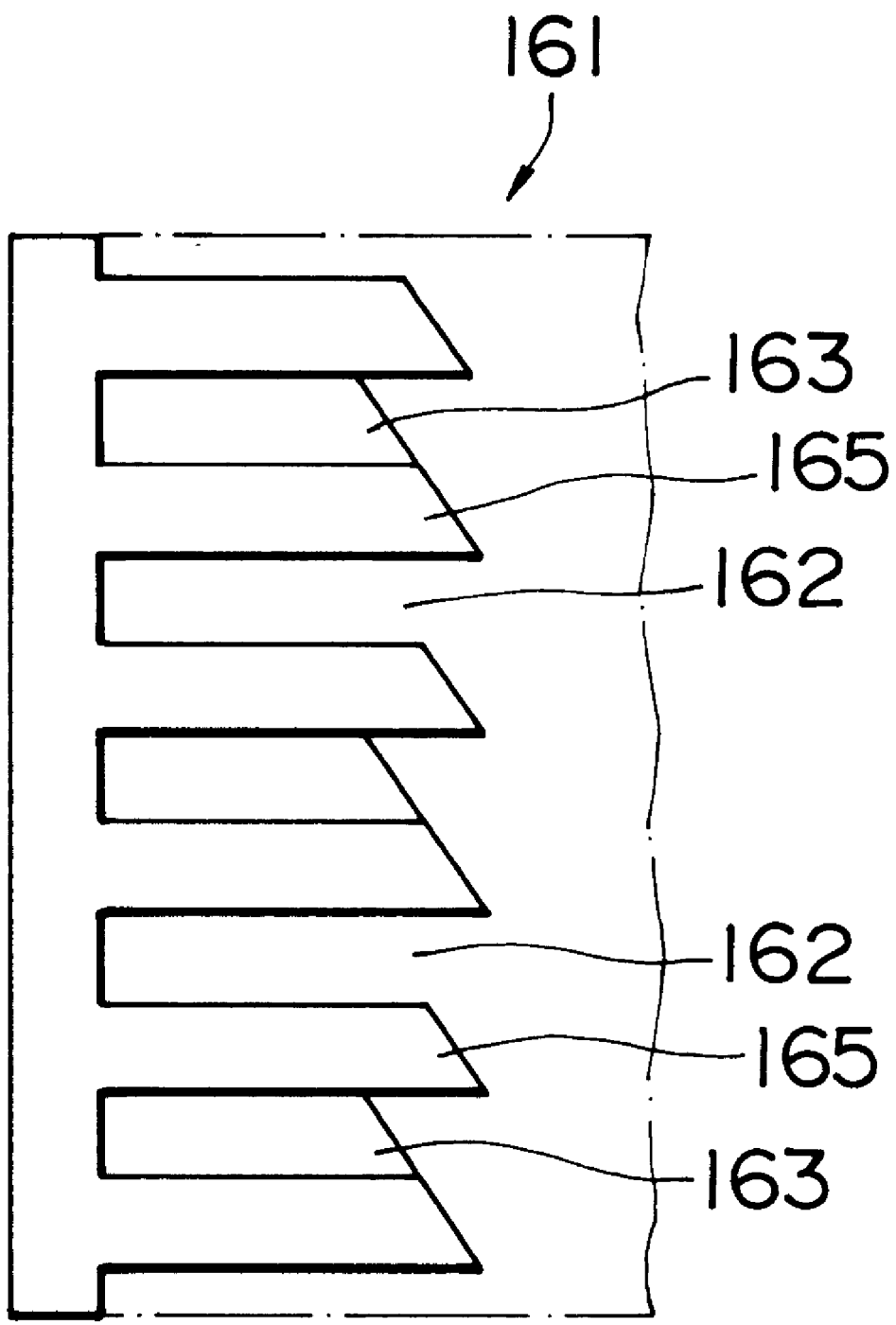
FIG. 17 is a developed view of the inner surface of the guide cylinder shown in FIG. 16.

FIG. 16 is a sectional view of the tip portion formed as a cone-like shape of the guide cylinder 161 and FIG. 17 is a developed view of the inner surface of the tip portion of the guide cylinder 161.

As shown in FIGS. 12, 16 and 17, three deep grooves 162 and three shallow grooves 163 each extending in the axial direction of the guide cylinder 161 are defined alternately in the circumferential direction of the guide cylinder 161. Linear guide convex portions 165 are defined between the respective deep grooves 162 and shallow grooves 163. An end surface formed at a position corresponding to the end portion of each shallow groove 163 and an end surface of each linear guide convex portion 165 are formed as a slope, respectively, which is inclined relative to the circumferential direction. The slopes of the shallow groove 163 and the linear guide convex portion 165 adjacent to each other are formed as a continuous slope, and the respective continuous slopes form a saw-blade-like shape as a whole.

Figure 18A:
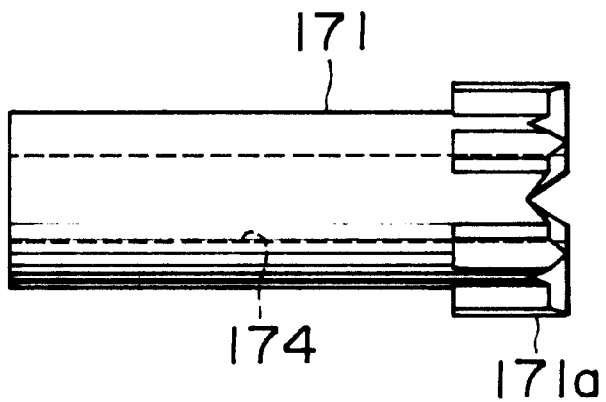
FIG. 18A is a side view of a reciprocating cam member shown in FIG. 12
Figure 18B:
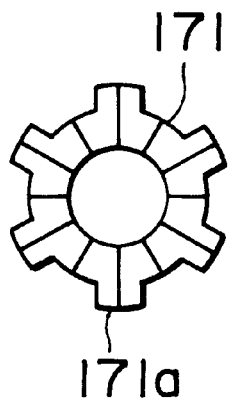
FIG. 18B is an elevational view thereof.

FIG. 18A is a side view of the reciprocating cam member 171 and FIG. 18B is an elevational view thereof. The reciprocating cam member 171 has six reciprocating cams 171a extending in the axial direction of the cam member and the tip portion of each reciprocating cam 171a is formed as an angle shape. The reciprocating cam member 171 is inserted into the guide cylinder 161 at a condition where the six reciprocating cams 171a engage all of three deep grooves 162 and three shallow grooves 163 and can slide along them. The angle-shaped tip portions are directed toward the valve casing 107 similarly to the sloped tip portions of the linear guide convex portions 165 and the shallow grooves 163 of the guide cylinder 161.

Figure 19A:
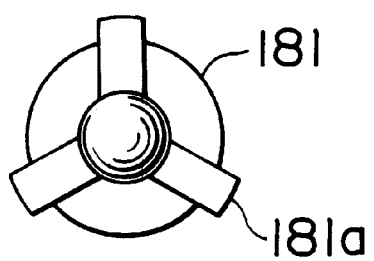
FIG. 19A is an elevational view of a rotating cam member shown in FIG. 12
Figure 19B:
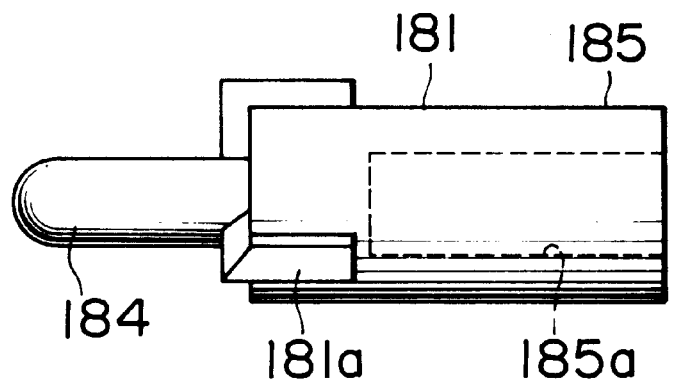
FIG. 19B is a side view thereof.

FIG. 19A is an elevational view of the rotating cam member 181 and FIG. 19B is a side view thereof. A front end portion 184 of the rotating cam member 181 is inserted into a slot 174 of the reciprocating cam member 171 and the movable member 142 is fitted into an inside hole 185a of a rear end portion 185 thereof. The rotating cam member 181 has three rotating cams 181a each having a sloped surface at its tip portion inclined at almost the same angle as those of the sloped tip portions of the linear guide convex portions 165 and the shallow grooves 163 of the guide cylinder 161 and each extending in the axial direction of the cam member. The rotating cams 181a can slide at a condition engaging with three deep grooves 162 of the guide cylinder 161, but cannot enter into the shallow grooves 163. The rotating cam member 181 is inserted into the guide cylinder 161 after the insertion of the reciprocating cam member 171, and the tip portions of the rotating cams 181a are directed toward the reciprocating cam member 171.

As shown in FIG. 9, the spring 191 is disposed between the collar 160 fitted into the front portion of the valve casing 107 at the screw portion of the guide cylinder 161 and a flange portion 142a of the movable member 142, and it urges the movable member 142 so that the movable member 142 is always brought into contact with the rotating cam member 181.

In the water purifier 101 having the above-described ball-type multi-way valve 105 according to this embodiment, the operation of the stopping mechanism 143 and the operation of switching water paths due to the pushing operation of the push button 110 are performed as follows.

Figure 20C:
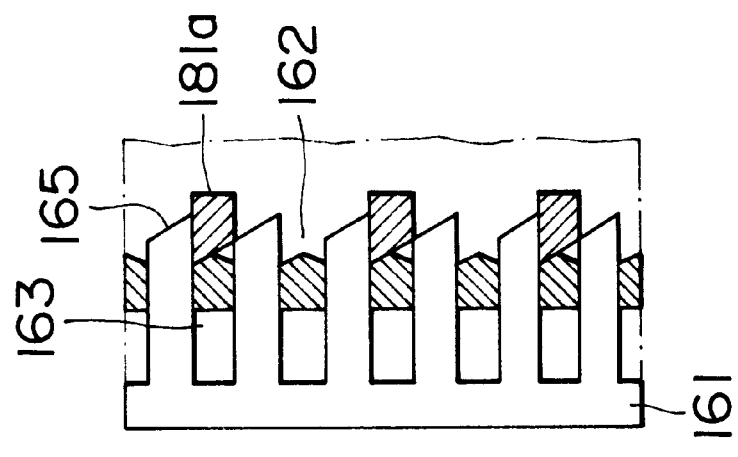
FIGS. 20A to 20C are developed views of the inner surface of the guide cylinder and the respective members showing the operation of a temporarily stopping mechanism.
Figure 20B:
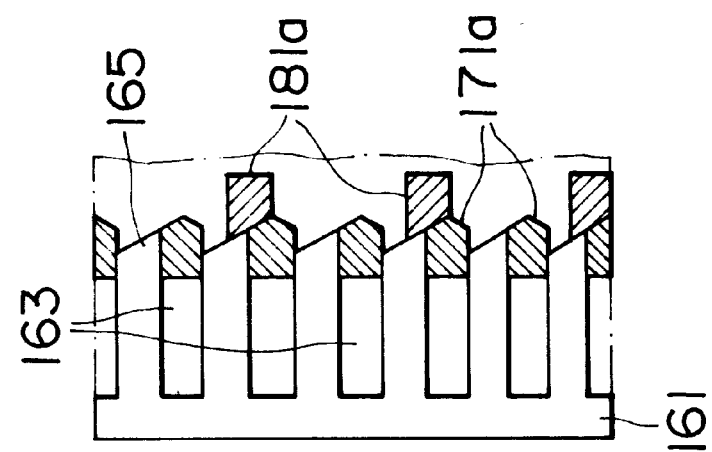
Figure 20A:
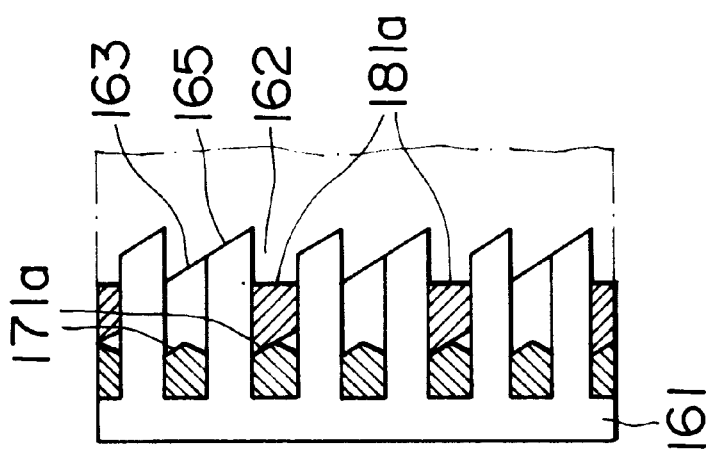

FIGS. 20A to 20C are developed views of the inner surface of the guide cylinder 161 and the respective members showing the operation of the stopping mechanism 143.

FIG. 20A shows a condition where the push button 110 is not pushed. The reciprocating cams 171a of the reciprocating cam member 171 are inserted into the deep grooves 162 and the shallow grooves 163 of the guide cylinder 161 of the stopping mechanism 143 up to the end portions of the grooves, successively the rotating cams 181a of the rotating cam member 181 are inserted into the deep grooves 162 so as to engage the inserted reciprocating cams 171a, and the rotating cam member 181 is urged by the spring 191 via the movable member 142. The reciprocating cam member 171, the rotating cam member 181 and the movable member 142 are temporarily stopped. As aforementioned, this condition indicates a state where the contact member 141 is placed at the first stop position $P_1$ via the movable member 142 (FIGS. 10 and 11), the first outlet 131 of the valve casing 107 is closed by the first ball 111 and the second outlet 132 is opened. Namely, in this condition, the raw water introduced from the inlet 121 passes through the second outlet 132 and is supplied to the filter device 103 through the raw water transfer port 119, and after filtration, the filtered water is discharged as a purified water.

When the push button 110 is pushed by an operator, the reciprocating cam member 171 is slid in the guide cylinder 161 in a direction toward the valve casing 107, the rotating cam member 181 is slid via the rotating cams 181a engaging the sloped tip portions of the reciprocating cams 171a, and the movable member 142 and the contact member 141 move toward the second stop position $P_2$ (FIGS. 9 and 11). When the rotating cams 181a get out from the deep grooves 162, as shown in FIG. 20B, the rotating cams 181a are slid along the slopes formed at the end surfaces of the linear guide convex portions 165 in the guide cylinder 161 by the urging force due to the spring 191, and as a result, the rotating cam member 181 is rotated by a half pitch.

The first ball 111 having been fitted into the first outlet 131 is pushed up and moved by the sliding operation of the contact member 141, and the first outlet 131 is opened. At that time, because the first ball 111 rolls in the valve casing 107, it is not in a frictional relationship with the inner bottom surface of the valve casing 107. Therefore, the first ball 111 almost is not abraded, and replacement due to the deterioration of the first ball 111 may be rare. Further, because the ratio of the diameter of the first ball 111 to the inner diameter of the first outlet 131 is in the range of 1:0.3 to 1:0.8, the first ball 111 is not fitted deeply into the first outlet 131. Furthermore, because the contact member 141 operates the first ball 111 at a position of the spherical surface eccentric from the center of gravity of the first ball 111 toward the first outlet 131, the first outlet 131 can be opened by a fairly small force. When this operation is performed, the contact member 141 rolls the second ball 112 to fit it into the second outlet 132.

When the pushing force operated onto the push button 110 by the operator is released, the rotating cams 181a are slid along the sloped tip portions of the shallow grooves 163 by the urging force of the spring 191, and as a result, the rotating cam member 181 is further rotated to reach the position shown in FIG. 20C, and the rotating cams 181a, which cannot enter into the shallow grooves 163, are engaged with and stopped by the sloped tip portions of the shallow grooves 163 and the side surfaces of adjacent linear guide convex portions 165. At that time, because the rotating cam member 181 is urged by the spring via the movable member 142, the motion of the rotating cam member 181 and the movable member 142 is temporarily stopped. As a result, the contact member 141 is stopped at the second stop position $P_2$ via the movable member 142, the first outlet 131 is opened and the second outlet 132 is kept to be in a condition closed by the second ball 112. Namely, in this condition, the raw water introduced from the inlet 121 is discharged from the shower discharge port 118 through the first outlet 131.

When the push button 110 is pushed again, the rotating cams 181a are pushed out up to the positions along the sloped tip portions of the linear guide convex portions 165 by the reciprocating cams 171a sliding along the shallow grooves 163. Thereafter, when the pushing force of push button 110 is removed, the rotating cams 181a are slid along the sloped tip portions of the linear guide convex portions 165 by the urging force of the spring 191, and as shown in FIG. 20A, the rotating cams 181a are slid and moved along the next respective deep grooves 162 to be returned to the initial condition. By this operation, the contact member 141 is returned to the first stop position $P_1$.

Thus, the stopping mechanism 143 is compactly constructed from a small number of parts of a single guide cylinder 161, reciprocating cam member 171, rotating cam member 181 and spring 191 relative to the plurality of outlets 131 and 132, the valve switching operation can be performed by an extremely easy and simple operation of only pushing the push button 110, and the switching of water paths can be achieved surely and easily.

Next, the filter device 103 will be briefly explained referring to FIG. 10.

The filter device 103 of this embodiment has substantially the same structure as that of the filter containing cartridge of the aforementioned first embodiment. Namely, a raw water inflow port 133 connected to the raw water transfer port 119 of the valve body 102 is provided to a container 134, and a transparent lid 148 and a non transparent cover 149 are provided on the upper portion of the container 134. In the container 134, a U-shaped hollow fiber bundle 145 potted to a synthetic resin member 146 at both end portions of the respective hollow fibers is provided in a cylindrical member 136, and an adsorbent layer 147 is charged between the outer surface of the cylindrical member 136 and the inner surface of the container 134. Further, filters 138 and 139 and an O-ring 137 are provided in the container 134. The raw water from the inflow port 133 flows through the filter 138, the adsorbent layer 147, the filter 139, the hollow fiber bundle 145 to a shower discharge port 135, and the water is discharged as a purified water from the shower discharge port 135.

Further, with respect to the connecting portion 200 between the portion of the raw water transfer port 119 of the valve body 102 and the portion of the raw water inflow port 133 of the filter device 103, a bayonet mechanism similar to that of the first embodiment is applied.

This second embodiment can be modified as follows.

Although the multi-way valve 105 is incorporated into the water purifier 101 in the above-described embodiment, because it is well known that use of a multi-way valve is not restricted to use for a water purifier, use of this multi-way valve 105 is not particularly restricted to use for the water purifier 101. For example, for use for general industry, another driving device such as an air or hydraulic cylinder can be applied instead of the push button 110, and in such an apparatus, the pushing or driving operation can be automated. Further, although the push button 110 and the movable member 142 formed as separate members in the embodiment, an end portion of the movable member 142 present at an opposite side to the balls may be constructed as a portion formed integrally with a push button portion. In such a structure, the end portion of the movable member 142 can function also as a push button.

Figure 21:
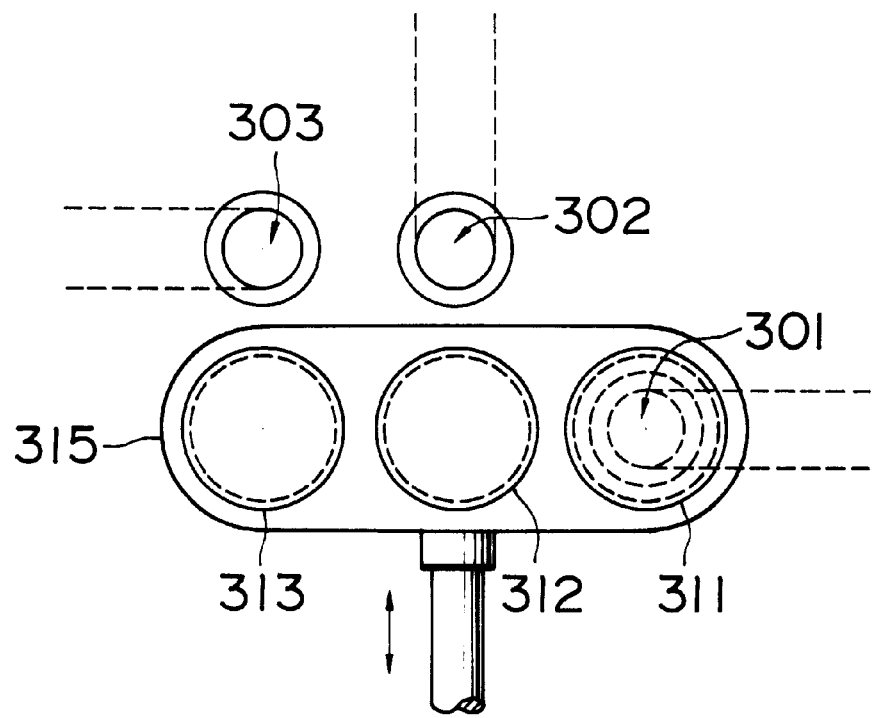
FIG. 21 is a plan view of a part of a multi-way valve according to a modification of the multi-way valve incorporated in the water purifier shown in FIG. 9.
Figure 22:
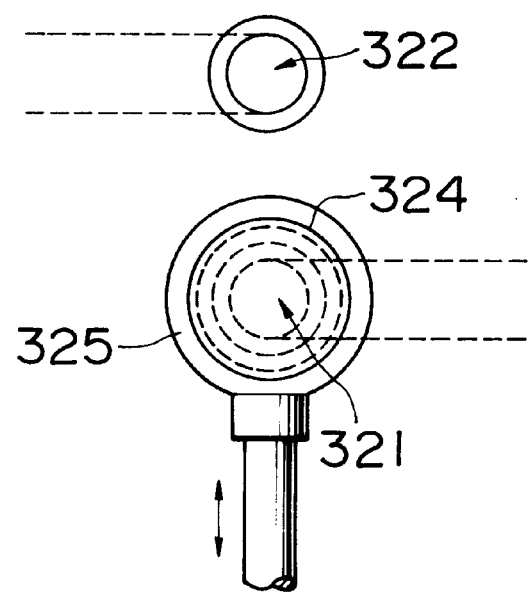
FIG. 22 is a plan view of a part of a multi-way valve according to another modification of the multi-way valve incorporated in the water purifier shown in FIG. 9.

Further, although two outlets 131 and 132 are provided in the valve casing 107 in the embodiment, for example, as shown in FIG. 21, three outlets 301 to 303 may be provided, and three balls 311 to 313 corresponding to the respective outlets 301 to 303 and a contact member 315 engaging these balls may be provided. Four or more outlets may be provided. Further, a structure as shown in FIG. 22 may be employed wherein two outlets 321 and 322 are opened and closed by a single ball 324 and the ball 324 is moved by a contact member 325.

Further, although a fluid to be purified in the embodiment is water, another liquid may be applied, and further, other fluids such as a gas may be applied.

Furthermore, although the above-described embodiment has been explained as to a water purifier wherein the filter device 103 is connected directly to the valve body 102, the present invention is not particularly restricted to this type of water purifier, and for example, a water purifier according to the present invention may be another type of water purifier such as a sink-top type water purifier as described later wherein a valve body and a filter device are disposed separately and connected via a hose.

Thus, in the multi-way valve and the water purifier using the same according to the second embodiment, since the contact member can displace the spherical valve elements provided in the valve casing by one pushing operation due to the pushing member (push button) via the movable member, the valve switching mechanism can be formed to be simple, and the plurality of fluid outlets can be opened and closed very easily and surely.

Next, a sink-top type water purifier according to a third embodiment of the present invention will be explained with reference to FIGS. 23 to 30.

Although the water purifiers having a cartridge type filter device have been explained in the above-described first and second embodiments, in this third embodiment, a sink-top-type water purifier using the multi-way valve according to the first embodiment will be explained. Of course, a similar sink-top type water purifier can be constructed by a using multi-way valve according to the second embodiment.

Figure 23:
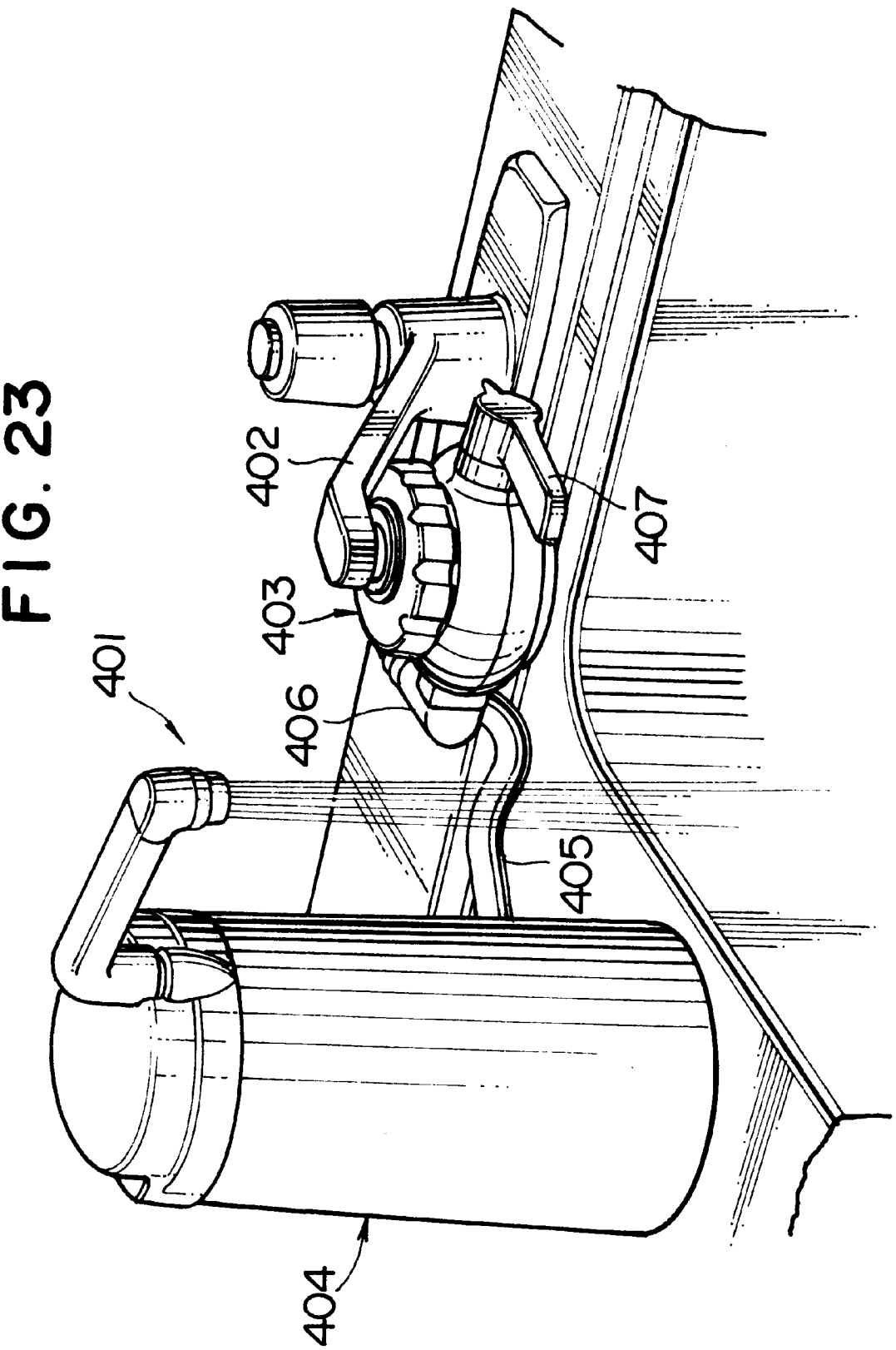
FIG. 23 is a perspective view of a top sink-type water purifier according to a third embodiment of the present invention.

FIG. 23 is a perspective view of a sink-top type water purifier according to this embodiment of the present invention. As shown in FIG. 23, water purifier 401 (hereinafter, also referred to as merely "a water purifier") comprises a valve body 403 connected directly to a faucet 402 for homes, a filter device 404 for purifying raw water and a hose 405 for connecting the valve body 403 and the filter device 404 and introducing the raw water into the filter device 404. A joint 406 is interposed between the valve body 403 and the hose 405, and a switching lever 407 is provided to valve body 403. This joint 406 is constructed using a bayonet mechanism described later.

The structure of the valve body 403 is similar to or substantially the same as that of the structure explained in the first embodiment. Therefore, hereinafter, the filter device 404 and the connection structure between the filter device 404 and the valve body 403 will be mainly explained.

Figure 24:
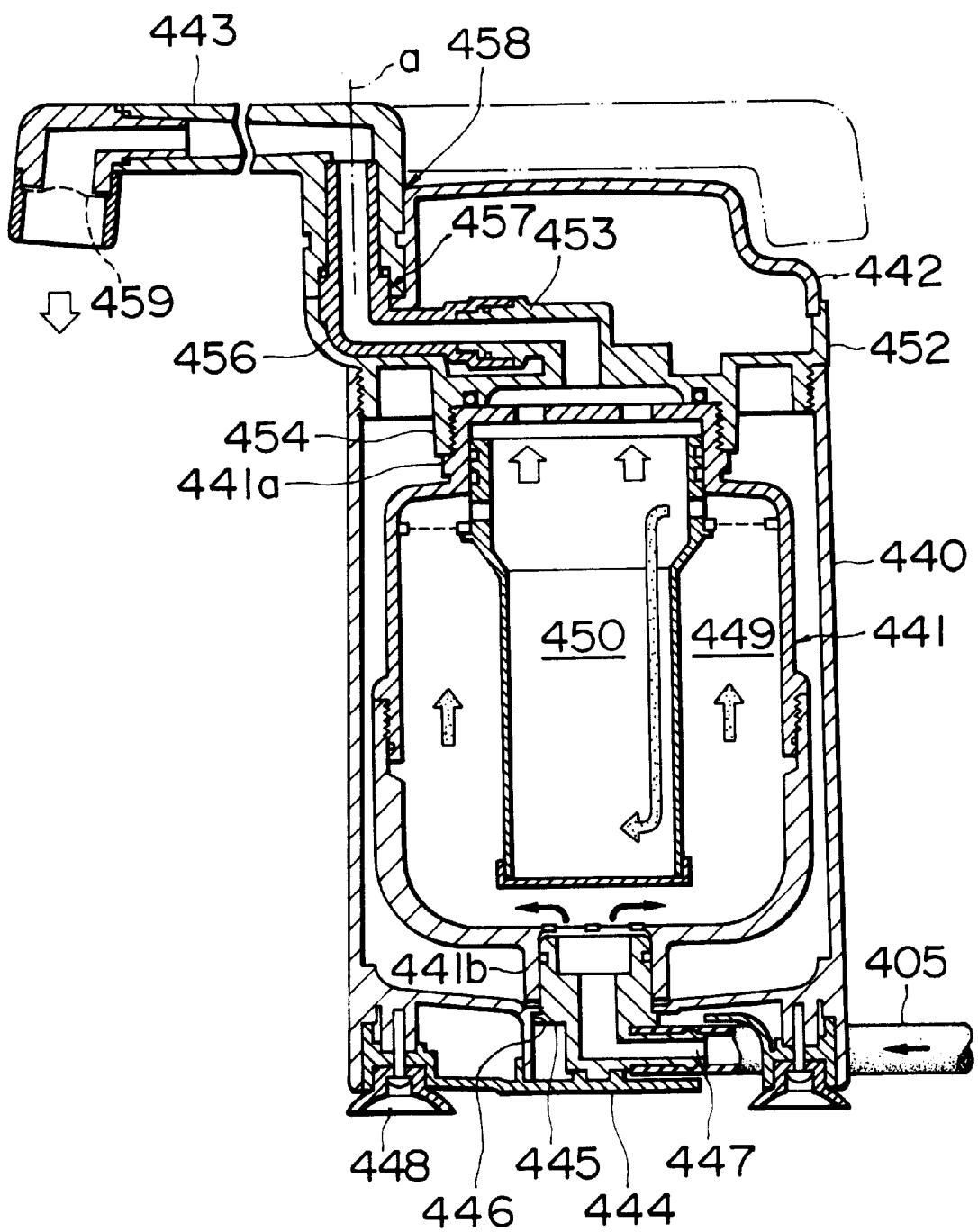
FIG. 24 is an enlarged vertical sectional view of a filter device of the water purifier shown in FIG. 23.

FIG. 24 shows a vertical section of the filter device 404. As shown in FIG. 24, the filter device 404 comprises a cylindrical outer container 440 having a bottom, a filter unit 441, a upper cover 442 supporting the filter unit 441 and fitted into the outer container 440, and a nozzle 443 for purified water.

The upper end of the outer container 440 is opened and a bottom plate 444 formed as a disc-like shape is fixed to the lower end of the outer container 440. One end of an L-shaped inlet nozzle 445 is inserted into and connected to an opening 446 defined at a central position of the bottom of the outer container 440 at a liquid hermetic sealing condition. The inlet nozzle 445 is rotatably supported by the bottom plate 444. The hose 405 is connected to a raw water inflow port 447 provided at the other end of the inlet nozzle 445 at a condition of fluid communication. An vacuum cup 448 is disposed on the bottom surface of the bottom plate 444 so that the filter device 404 can be easily attached to or detached from a base such as a sink.

The filter unit 441 comprises an outer layer 449 comprising, for example, an adsorbent such as activated carbon and a activated coral sand, and an inner layer 450 charged with hollow fibers.

A filter supporting plate 452 is attached to the lower end of the upper cover 442, and this filter supporting plate 452 is screwed to the outer container at an attachable and detachable condition. The filter supporting plate 452 has an L-shaped outflow port 453 extending in a radially outer direction from a central portion of the upper surface of the filter supporting plate 452, and a short cylindrical projected portion 454 at a central portion of the lower surface of the filter supporting plate 452. An upper-end discharge port 441a of the filter unit 441 is connected into the inner surface of the projected portion 454 at an attachable and detachable condition. A lower-end inflow port 441b of the filter unit 441 is connected onto the outer surface of the inlet nozzle 445 at an attachable and detachable condition and at a condition of fluid communication.

One end portion of an L-shaped connecting nozzle 456 is extended outwardly and upwardly from a semi-circular depressed portion 458 having an opening 457 which is formed at an edge portion of the upper surface of the upper cover 442, and the other end portion of the connecting nozzle 456 is connected to the outflow port 453 of the filter supporting plate 452 at a condition of fluid communication.

One end portion of an L-shaped nozzle 443 for purified water is connected to the outer end portion of the connecting nozzle 456 at a condition of fluid communication, and the nozzle 443 is supported rotatably around "a" axis. The other end portion of the nozzle 443 is bent downward, and a spray nozzle 459 is provided in this end portion.

Figure 25:
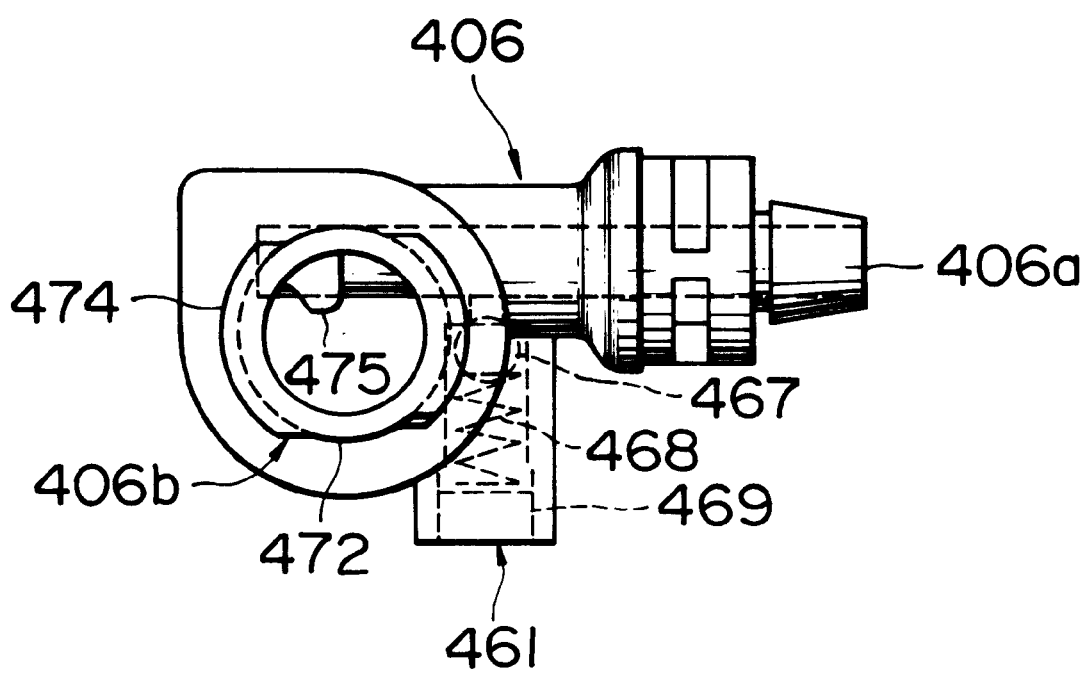
FIG. 25 is an elevational view of a joint of the water purifier shown in FIG. 23.

Next, the joint member will be explained referring to FIG. 25. FIG. 25 is an elevational view of a joint.

As shown in FIG. 25, the joint 406 is formed as an L-shaped cylindrical pipe-like shape. The hose 405 is fitted into a telescoping hose inserting port 406a of the joint 406. An opening 461 extending downward is provided on the joint 406, and a ball 467 and a spring 468 are inserted into the opening 461 for controlling a water pressure in the joint 406 at an appropriate value, and an adjusting member 469 having a hole extending in the axial direction is screwed into the opening 461. Namely, when the water pressure in the joint 406 increases, the ball 467 is pressed by the water pressure against the urging force of the spring 468 and a water path is formed in the opening 461, and therefore, the water pressure can be controlled at a constant pressure as well as preventing the coming off of the hose 405. A connecting port 406b of the joint 406 positioned at the valve body side forms an end of the bayonet mechanism.

Figure 26:
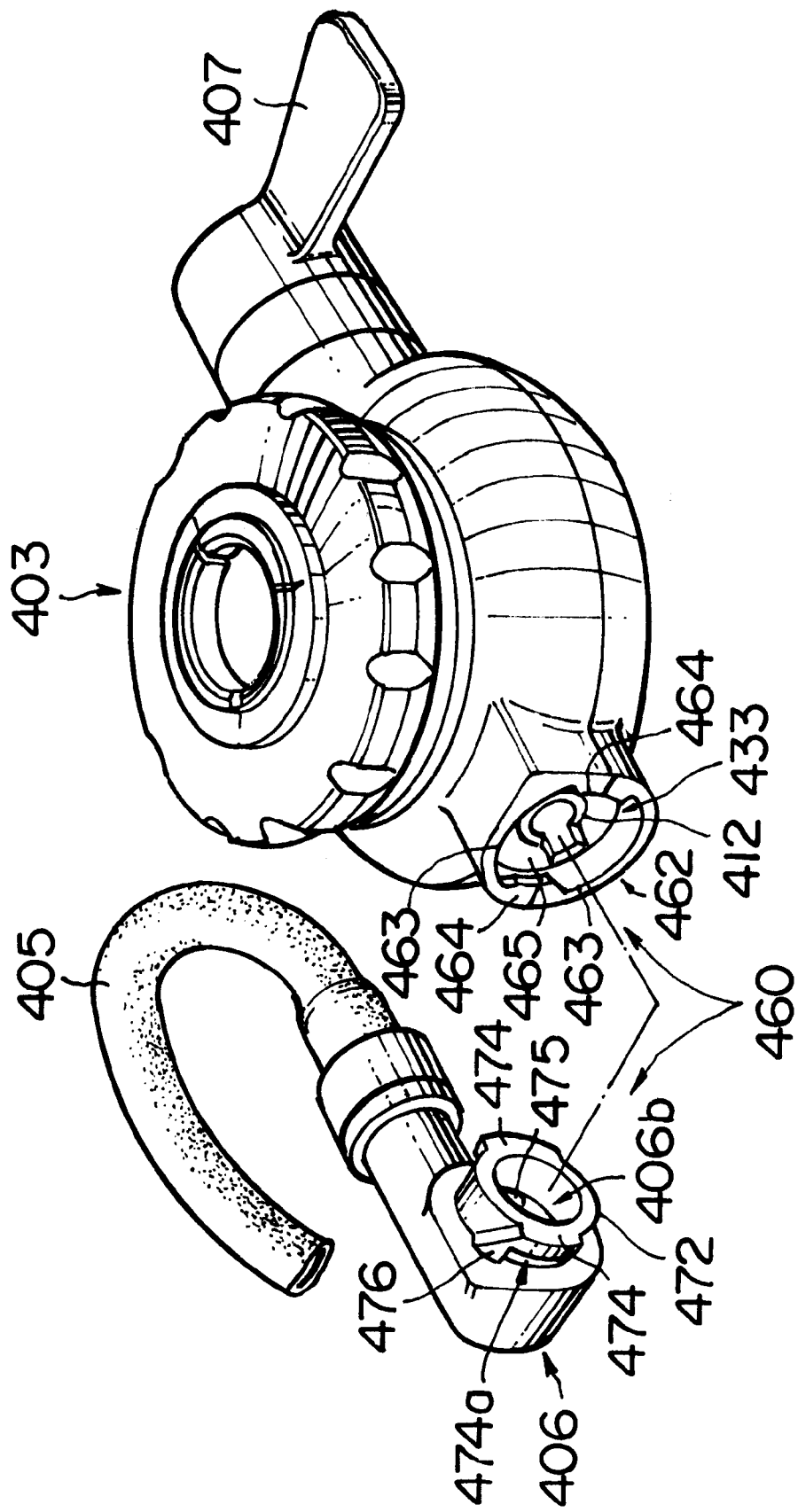
FIG. 26 is an exploded perspective view of a part of the water purifier shown in FIG. 23.
Figure 27:
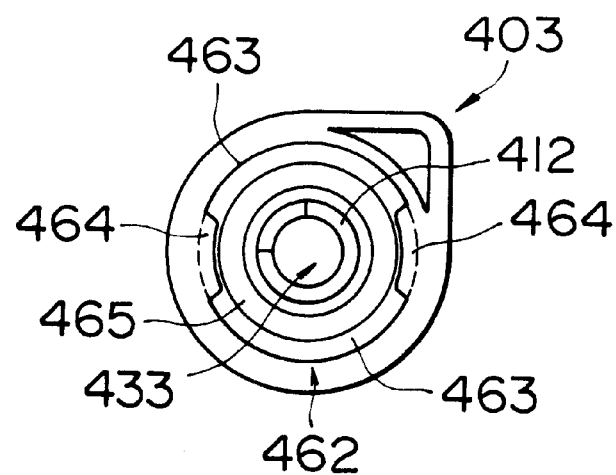
FIG. 27 is an elevational view of an inlet of a multi-way valve incorporated into the water purifier shown in FIG. 23.

Hereinafter, the bayonet mechanism constituting a connecting portion 460 between a raw water transfer port 433 of the valve body 403 and the connecting port 406b of the joint will be explained. FIG. 26 is a perspective view showing the bayonet mechanism of the connecting portion 460 at a condition where the joint 406 is taken off from the valve body 403, and FIG. 27 is an elevational view showing the raw water transfer port 433 of the valve body 403. In the figures, the switching lever 407 and a spool shaft 412 have substantially the same structures as those of the aforementioned first embodiment.

As shown in FIGS. 26 and 27, the raw water transfer port 433 provided on the side of the valve body 403 is formed as a cylindrical concave portion 462. This concave portion 462 forms one end of the bayonet mechanism. A pair of notched portions 463 and a pair of concave-side protruded portions 464 extending in the circumferential direction are provided on the inner surface of the opening end portion of the concave portion 462, respectively. A packing 465 is fitted into the concave portion 462 at a rear portion of the concave portion 462.

As shown in FIGS. 25 and 26, the connecting portion 406b of the valve body side of the joint 406 is formed as a cylindrical convex portion 472 so that the concave portion 462 can be inserted thereinto. This convex portion 472 forms the other end of the bayonet mechanism. Namely, the outer diameter of the convex portion 472 is set slightly smaller than the inner diameter defined by the inner tip portions of the pair of protruded portions 464 of the concave portion 462. A pair of convex-side protruded portions 474 capable of being inserted into the pair of notched portions 463 formed on the inner surface of the concave portion 462 are formed on the outer surface of the convex portion 472 at the tip portion of the convex portion 472. A projection 475 is formed on the inner surface of the convex portion 472. This projection 475 engages the tip portion of the spool shaft 412 extending up to the position of the raw water transfer port 433 of the valve body 403.

Figure 28:
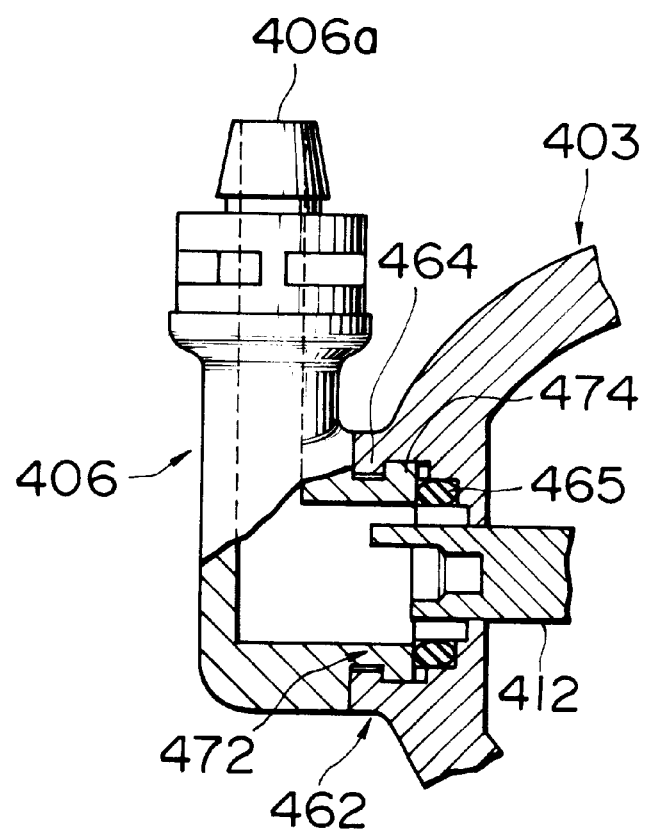
FIG. 28 is a vertical sectional view of a bayonet mechanism employed in the water purifier shown in FIG. 23.

FIG. 28 is a vertical sectional view of the connecting portion 460 showing a condition where the concave portion 462 of the valve body 403 and the convex portion 472 of the joint 406 are engaged to each other.

As shown in FIG. 28, by inserting the convex portion 472 into the concave portion 462 and then rotating the both portions relatively around the axis, the facing surfaces of the concave-side protruded portions 464 and the convex-side protruded portions 474 are engaged to each other, and the valve body 403 and the joint 406 are connected to each other. When both portions are relatively rotated in the reverse direction, the concave-side protruded portions 464 and the convex-side protruded portions 474 are separated from each other and a condition capable of detaching the valve body 403 and the joint 406 from each other can be realized.

As shown in FIG. 26, the side surface 474a of each convex-side protruded portion 474 engaging each concave-side protruded portion 464 is inclined along the circumferential direction, and the relative movement of both portions in the rotational direction can be smoothed as well as the engaging degree of both portions can be improved. A stopper 476 is provided at the circumferential end position of each convex-side protruded portion 474 for regulating the relative rotational movement of both portions 474 and 462 around the axis. When the end portion of the concave-side protruded portion 464 comes into contact with this stopper 476 of the convex-side protruded portion 474, both protruded portions 464 and 474 can engage with each other appropriately, and the tip surface of the convex portion 472 presses the packing 465 (FIG. 28) so that the convex portion 472 and the concave portion 462 are engaged at a liquid hermetic sealing condition.

Figure 29:
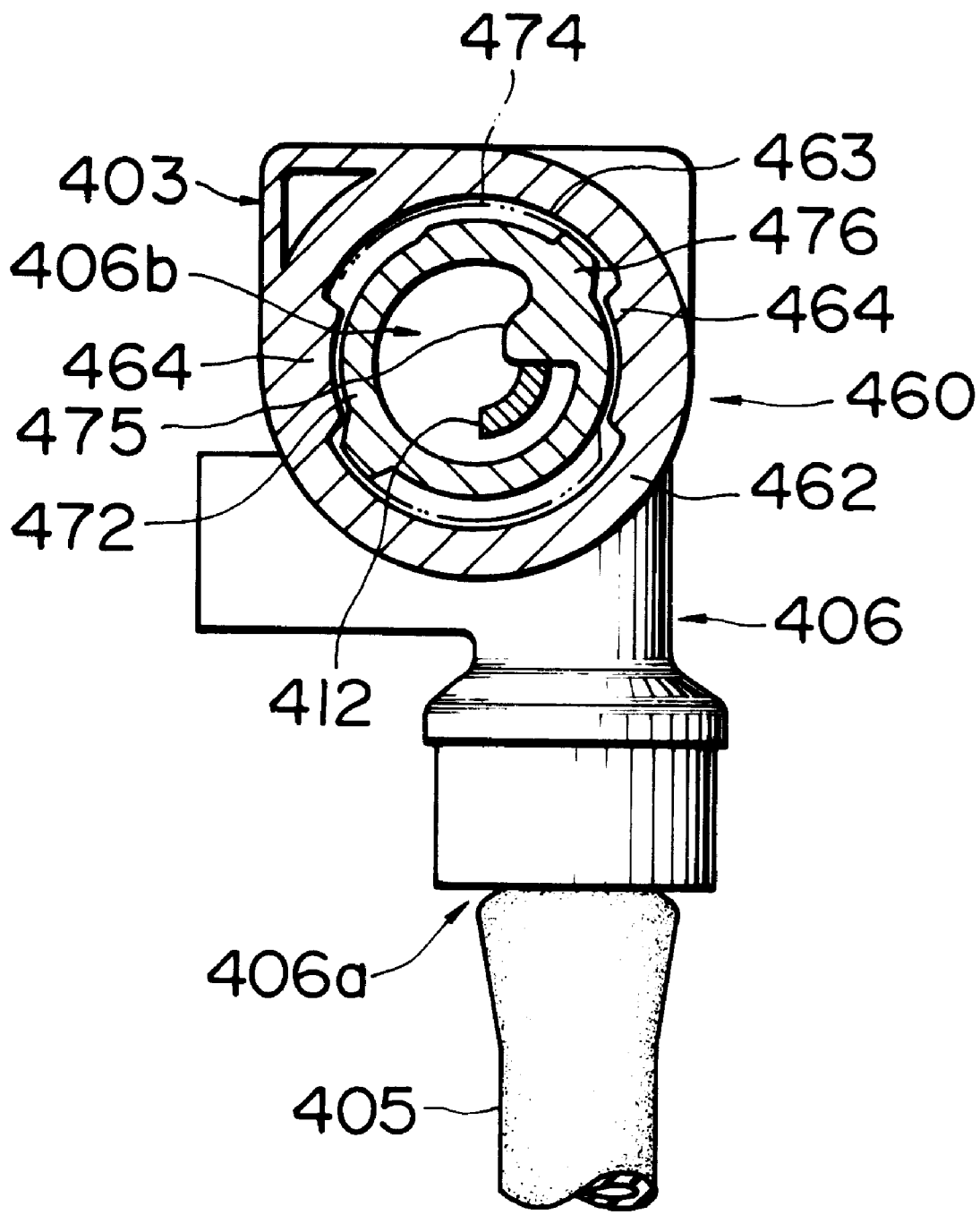
FIG. 29 is a sectional view of the bayonet mechanism shown in FIG. 28 for explaining an operation condition of the bayonet mechanism.

FIGS. 29 and 30 are vertical sectional views of the connecting portion 460 for explaining the connecting operation.

In a case where the joint 406 connected to the hose 405 is connected to the valve body 403 fixed at a vertically standing condition, at the first step, as shown in FIG. 29, the hose inserting port 406a of the joint 406 is set at a vertically standing condition so that it is directed downward. At this condition, the convex-side protruded portions 474 of the convex portion 472 are inserted into the notched portions 463 of the concave portion 462. At the second step, as shown in FIG. 30, the joint 406 is rotated in a counterclockwise direction by an angle of about 90 degrees as viewed from the side of the valve body 403. By this operation, the concave-side protruded portions 464 go to a position between the base portion of the convex portion 472 of the joint 406 and the convex-side protruded portions 474 (FIGS. 26 and 28). As the joint 406 is being rotated, the respective concave-side protruded portions 464 are gradually engaging the slopes 474a of the respective convex-side protruded portions 474, and when the end portions of the concave-side protruded portions 464 come into contact with the respective stoppers 476, the valve body 403 and the joint 406 are connected at a liquid hermetic sealing condition. At that time, the joint 406 is set at a horizontal condition (FIG. 30).

Thus, in the water purifier 401 according to this embodiment, the joint 406 connected to the hose 405 can be connected to the valve body 403 substantially merely by the second step. Therefore, as compared with the conventional screw-type joint, the joint 406 can be connected to the valve body 403 easily and appropriately. Further, when the joint 406 is connected by setting the hose inserting port 406a of the joint 406 at a vertically standing condition so that it is directed upward contrary to the above-described condition, inserting the convex portion 472 into the concave portion 462 and rotating it by an angle of about 90 degrees for connection, because the hose inserting port 406a is set at a horizontal direction contrary to the above-described direction, the setting position and direction thereof can be appropriately changed so that the connected hose 405 is not obstructed.

Where, there is a case where the joint 406 is detached from the valve body 403 in a condition that the cam of the spool shaft 412 opens the water path communicating the filter device 404, that is, the switching lever 407 is set at a position for water purification (refer to the first embodiment). In such a case, the projection 475 provided on the inner surface of the convex portion 472 engages the tip portion of the spool shaft 412 extending up to the raw water transfer port 433 accompanying with the relative rotation of the convex portion 472 and the concave portion 462 around the axis, and the projection 475 rotates the spool shaft 412 such that the above-described water path is closed (FIG. 26). By this operation, even when the joint 406 is detached from the valve body 403, it does not occur that raw water drops from the raw water transfer port 433.

In the water purifier according to the third embodiment, since the multi-way valve similar to that of the first embodiment is employed, the amount of movement of a selected valve element for opening and closing a selected water path can be decreased as compared with conventional multi-way valves, the multi-way valve can be formed small-sized as a whole and the amount of resident fluid in the valve can be reduced. Moreover, when the valve elements are taken off or exchanged, because only the upper portion of the valve casing may be opened, the operation therefore can be facilitated as compared with the operation for the conventional valves wherein almost the whole of the valve must be disassembled.

Further, because the raw water transfer port of the valve body and the joint connected to the hose are connected to each other by the above-described bayonet mechanism, the valve body and the joint (the hose) can be attached to and detached from each other very easily and adequately. Moreover, because the attaching condition and the direction of the joint including the hose can be appropriately changed, the hose can be appropriately set at a direction desired for attachment or detachment so that the hose is not obstructed.

Furthermore, in the bayonet mechanism, by inclining at least one side surface of the convex-side protruded portion and the concave-side protruded portion along the circumferential direction, the convex portion and the concave portion can relatively rotate smoothly around the axis as well as the both protruded portions can engage with each other at a good contact condition when both portions are connected to each other. At the connecting operation, the stopper formed on the end portion of at least one of the convex-side protruded portion and the concave-side protruded portion can appropriately regulate the relative positions of the convex portion and the concave portion in their rotational direction around the axis, and the valve body and the joint with the hose can be connected at an appropriate directional condition as well as a water leakage at the connecting portion can be surely prevented.

Although preferred embodiments of the present invention have been described in detail herein, the invention is not limited thereto. It will be appreciated by those skilled in the art that various modifications may be made without materially departing from the novel and advantageous teachings of the invention. Accordingly, the embodiments disclosed herein are by way of example. It is to be understood that the scope of the invention is not to be limited thereby, but is to be determined by the claims which follow.

What is claimed is:

1. A water purifier comprising a multi-way valve for switching raw incoming water to at least one of a plurality of outflow destinations, and means for filtering said raw water through said multi-way valve, said multi-way valve comprising:
a valve casing having a fluid inlet and a plurality of fluid outlets;
a first chamber and a second chamber defined in said valve casing, said first chamber communicating with said fluid inlet, said second chamber communicating with said plurality of fluid outlets, respectively;
a partition disposed between said first and second chambers and separating said first and second chambers, said partition having a plurality of fluid paths provided in correspondence with said plurality of fluid outlets and capable of connecting said first and second chambers to each other;
a plurality of valve elements located on one side of said partition, each of said valve elements being associated with a fluid path and each being capable of lifting and lowering from and to said partition for opening and closing each said corresponding fluid path; and
a driving device (i) located on a side of said partition opposite said valve elements, (ii) having cams, and (iii) being constructed and arranged to selectively move said plurality of valve elements back and forth from open and closed positions;
said means for filtering comprising:
a container;
an inflow port;
at least one filter; and
a discharge port,
wherein said inflow port is in communication with at least one of said fluid outlets of said multi-way valve.

2. The water purifier according to claim 1, wherein said valve elements are spherical elements.

3. The water purifier according to claim 2, wherein each of said valve elements comprises a core composed of a rigid material and a sheath comprising an elastic material provided on the surface of said core.

4. The water purifier according to claim 1, wherein said driving device comprises a rotatable body on which said cams are spaced apart from each other along an axial direction of said rotatable body.

5. The water purifier according to claim 1, wherein connecting paths are provided between said plurality of fluid paths and said plurality of fluid outlets, respectively, and the respective paths are separated from each other by said driving device.

6. The water purifier according to claim 1, wherein said filtering means comprises an exchangeable cartridge-type filter device.

7. The water purifier according to claim 1, wherein said filtering means is separate from said valve casing and adapted to be mounted upon a separate surface adjacent a sink and connected by a separate connector to receive water from said second chamber.

8. The water purifier according to claim 1, wherein in a closed position said valve elements are seated against one side of said partition in said first chamber, each being capable of lifting and lowering from and into contact with said partition for opening and closing each said corresponding fluid path, and said driving device is in said second chamber, and constructed and arranged to selectively lift and release said plurality of valve elements from open and closed positions, thereby selectively opening and closing said valves, thereby selectively opening and closing said fluid paths from said first chamber to said second chamber.

9. A water purifier comprising a multi-way valve for switching raw incoming water to at least one of a plurality of outflow destinations, and means for filtering said raw water through said multi-way valve, said multi-way valve comprising:
a valve casing having a fluid inlet and a plurality of fluid outlets;
at least one spherical element disposed in said valve casing for opening and closing said fluid outlets;
a contact member constructed and arranged to be brought into contact with said spherical element, said contact member being movable to open and close said fluid outlets by displacing said spherical element;
a movable member in said purifier constructed and arranged for moving said contact member;
a pushing member arranged for driving said movable member by pushing of said pushing member; and
a stopping mechanism arranged for temporarily stopping said movable member at a predetermined position;
said means for filtering comprising:
a container;
an inflow port;
at least one filter; and
a discharge port,
wherein said inflow port is in fluid communication with at least one of said fluid outlets of said multi-way valve.

10. The water purifier according to claim 9, wherein said movable member has capacity to be moved reciprocatively in said purifier to effect the said movement of said contact member.

11. The water purifier according to claim 9, wherein said stopping mechanism comprises:

a guide cylinder having a number of deep grooves and the same number of shallow grooves defined on an inner surface of the guide cylinder and arranged to extend in an axial direction of the guide cylinder, said deep grooves and shallow grooves being arranged alternately circumferentially of the guide cylinder and defining linear guide convex portions between respective adjacent deep grooves and shallow grooves, an end surface of each linear guide convex portion and an end surface formed at a position corresponding to an end portion of each shallow groove adjacent to said each linear guide convex portion being formed as a slope;

a reciprocating cam member having reciprocating cams slidable along said deep grooves and shallow grooves;

a rotating cam member engaged to said movable member and having rotating cams slidable only along said deep grooves; and means for urging said movable member toward said rotating cam member.

12. The water purifier according to claim 9, wherein a rotation preventing member is provided in said valve casing for preventing rotation of said contact member.

13. The water purifier according to claim 9, wherein said contact member is arranged to come into contact with a spherical surface of said spherical element at a position eccentric from the center of gravity of said spherical element toward said fluid outlets.

14. The water purifier according to claim 9, wherein the ratio of the diameter of said spherical element to the inner diameter of said fluid outlets is in the range of 1:0.3 to 1:0.8.

15. The water purifier according to claim 9, wherein said filtering means comprises an exchangeable cartridge-type filter device.

16. The water purifier according to claim 9, wherein said filtering means is adapted to be mounted upon a separate surface adjacent a sink and connected to a water source positioned above said sink.

\* \* \* \* \*

UNITED STATES PATENT AND TRADEMARK OFFICE
CERTIFICATE OF CORRECTION

PATENT NO.  : 5,989,425
DATED       : November 23, 1999
INVENTOR(S) : Yonezawa et al It is certified that error appears in the above-indentified patent and that said Letters Patent is hereby corrected as shown below:

In Column 2, at line 47, please insert --upon-- after "improved".

In Column 5, at line 55, please delete "the", first occurrence.

In Column 9, at line 14, please delete "intred"; and
   at line 60, please change "with" to --to--.

In Column 10, at line 5, please change "flowing" to --flow--.; and
   at line 15, please change "one or another" to --one or the other--.

In Column 19, at line 36, please delete "sink-top".

In Column 20, at line 4, please change "An" to --A--.

Signed and Sealed this

Seventeenth Day of April, 2001

Attest:

NICHOLAS P. GODICI

*Attesting Officer*   *Acting Director of the United States Patent and Trademark Office*